B. C. STICKNEY.
COMBINED TYPE WRITING AND COMPUTING MACHINE.
APPLICATION FILED JAN. 4, 1913.

1,288,259.

Patented Dec. 17, 1918.
9 SHEETS—SHEET 1.

WITNESSES:

INVENTOR:
Burnham C Stickney

B. C. STICKNEY.
COMBINED TYPE WRITING AND COMPUTING MACHINE.
APPLICATION FILED JAN. 4, 1913.

1,288,259.

Patented Dec. 17, 1918.
9 SHEETS—SHEET 2.

WITNESSES:
Julius Duckstine
J. H. Brophy

INVENTOR:
Burnham C. Stickney

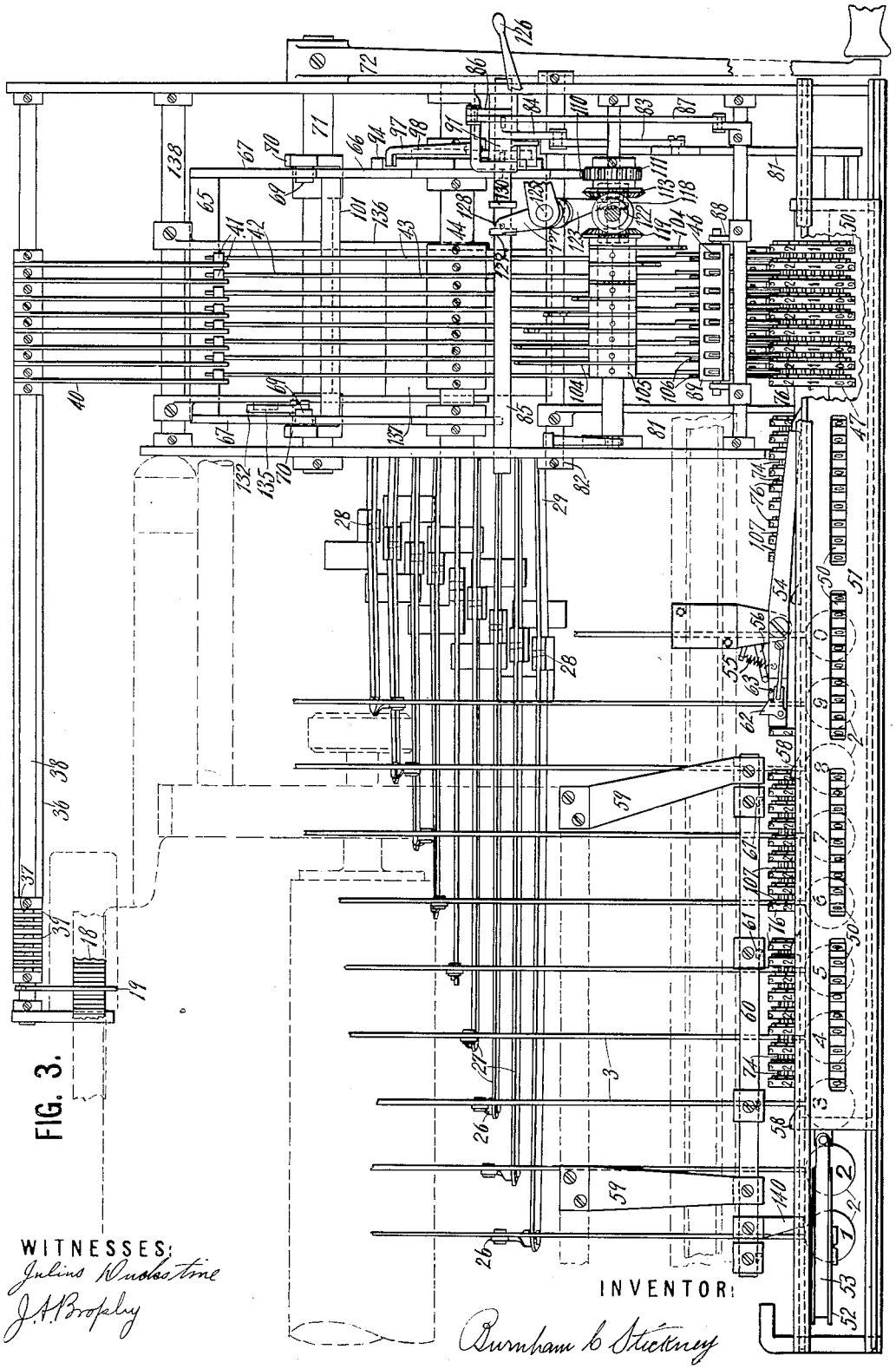

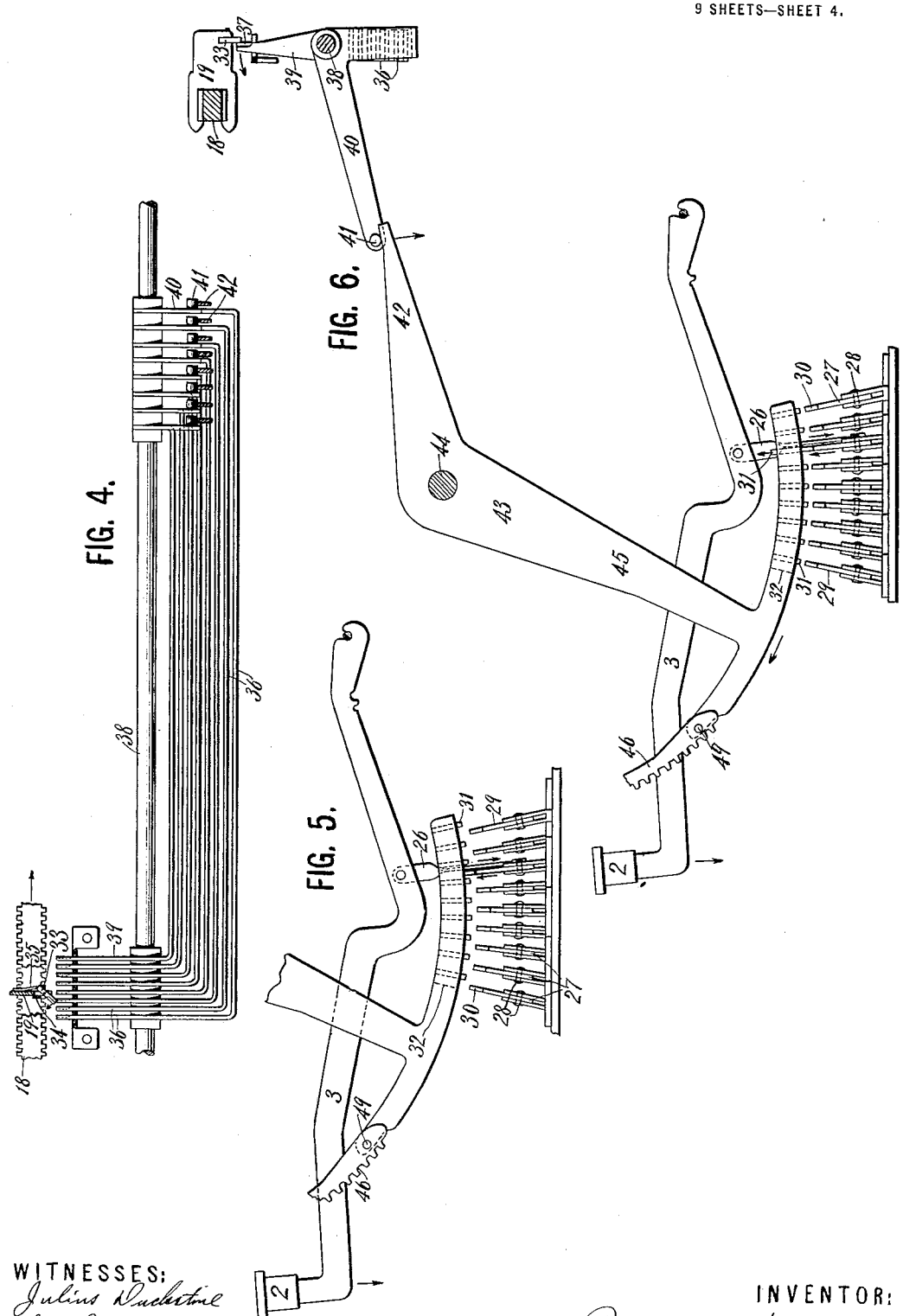

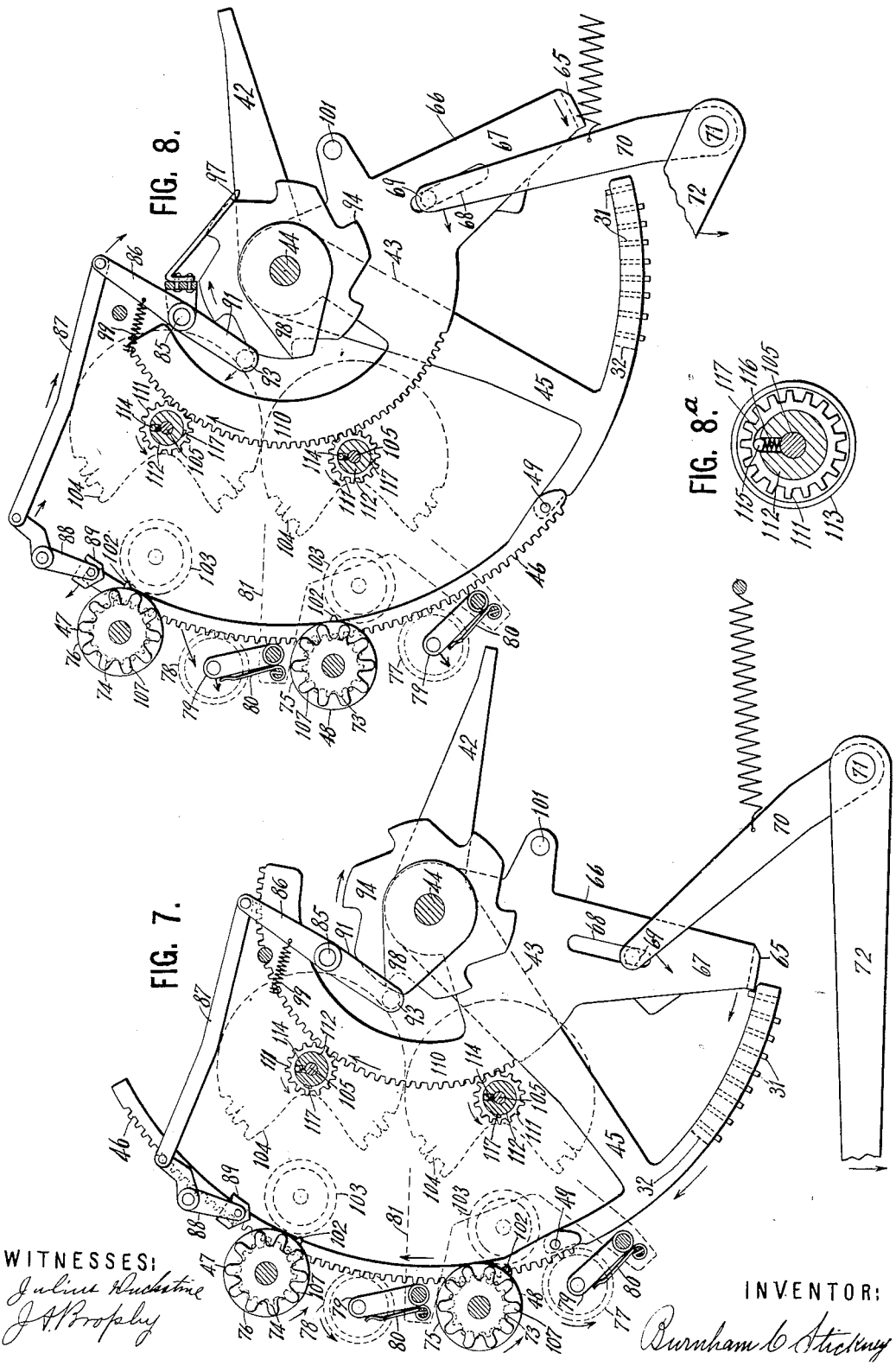

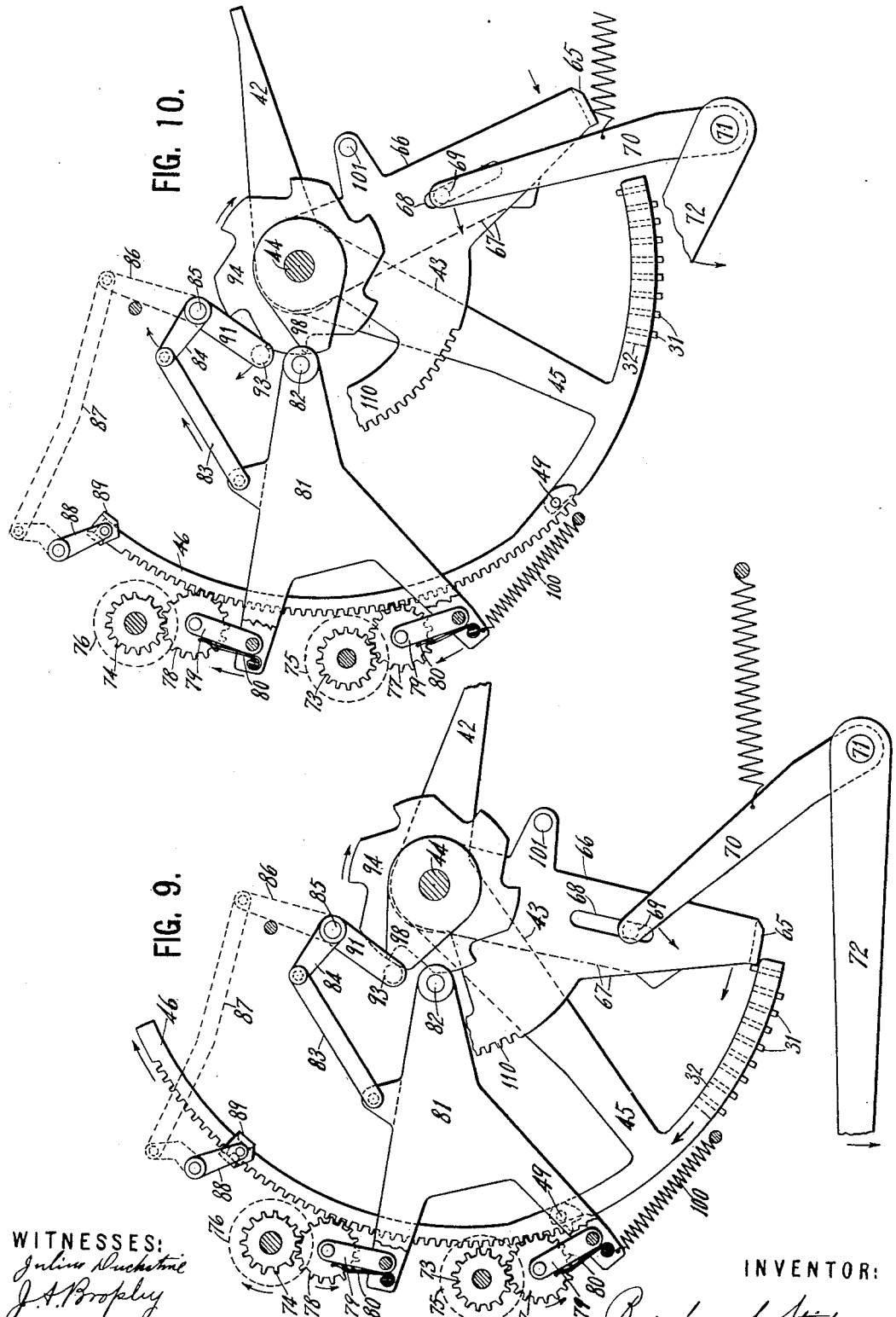

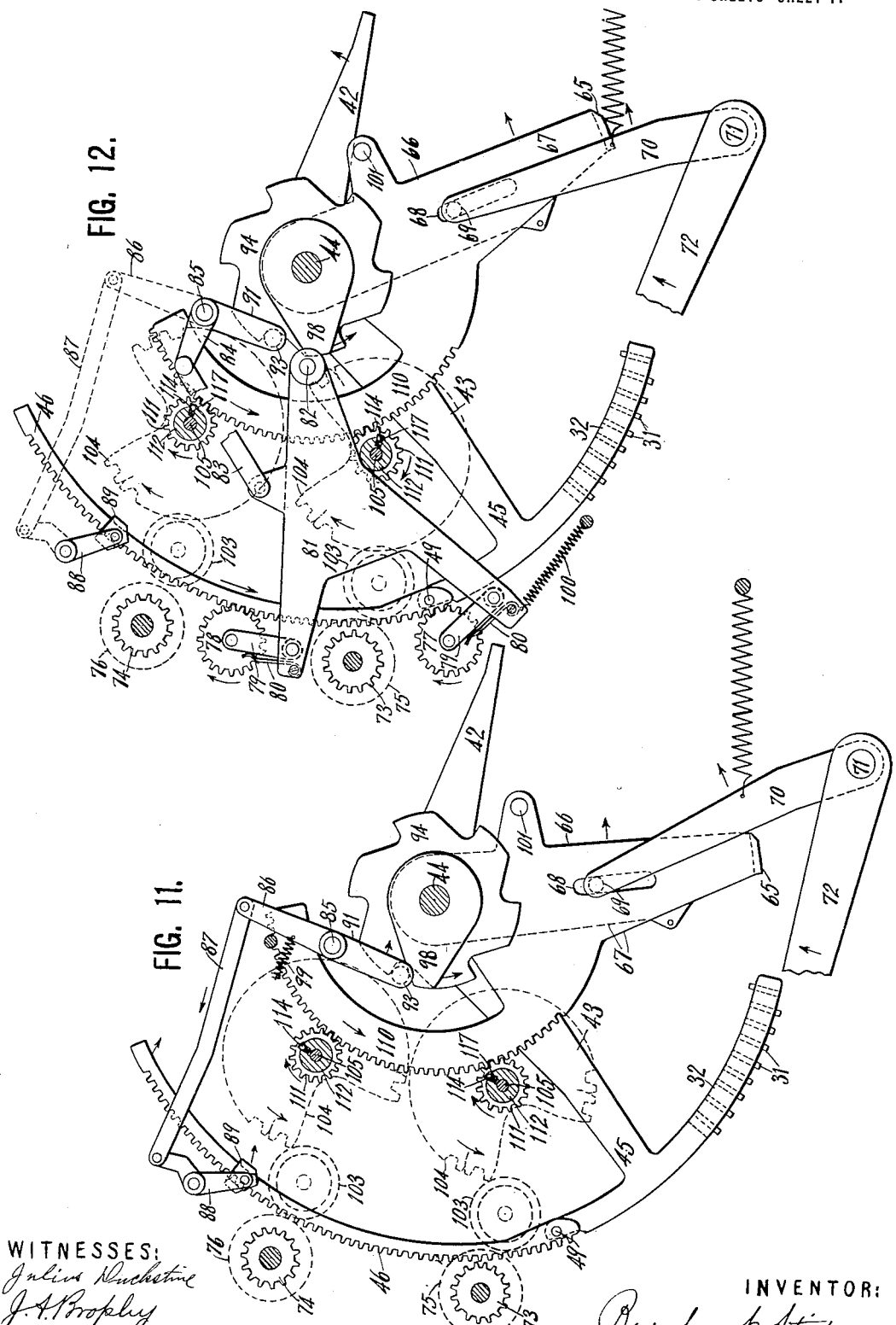

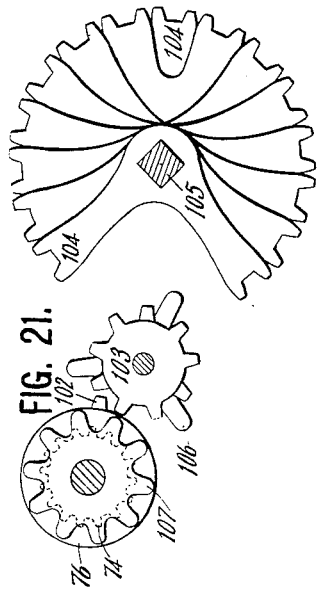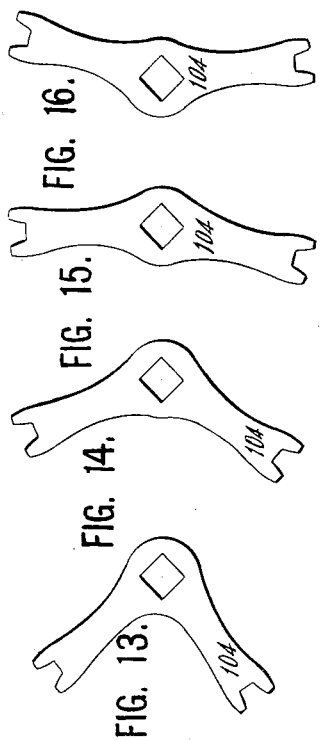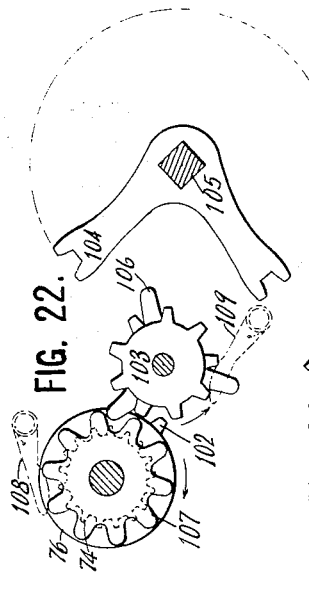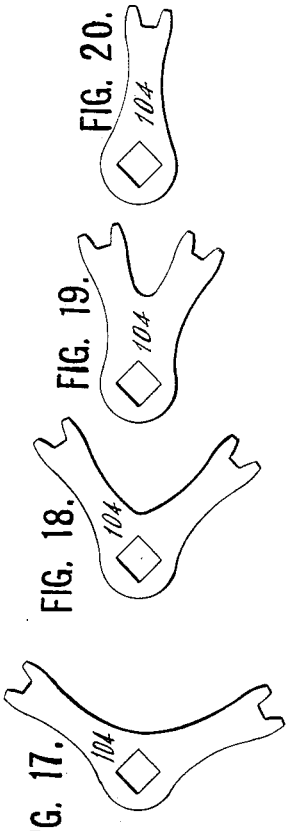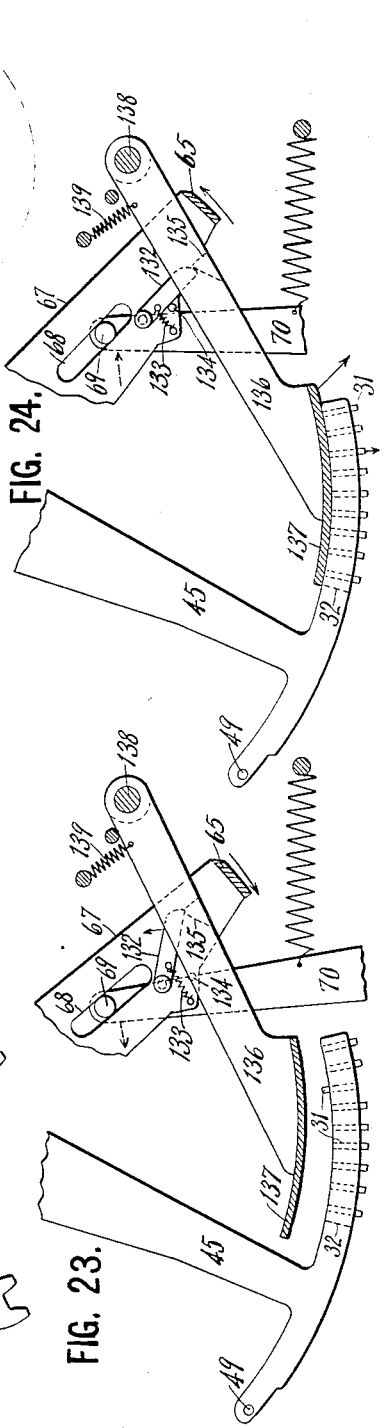

B. C. STICKNEY.
COMBINED TYPE WRITING AND COMPUTING MACHINE.
APPLICATION FILED JAN. 4, 1913.
1,288,259. Patented Dec. 17, 1918.
9 SHEETS—SHEET 9.
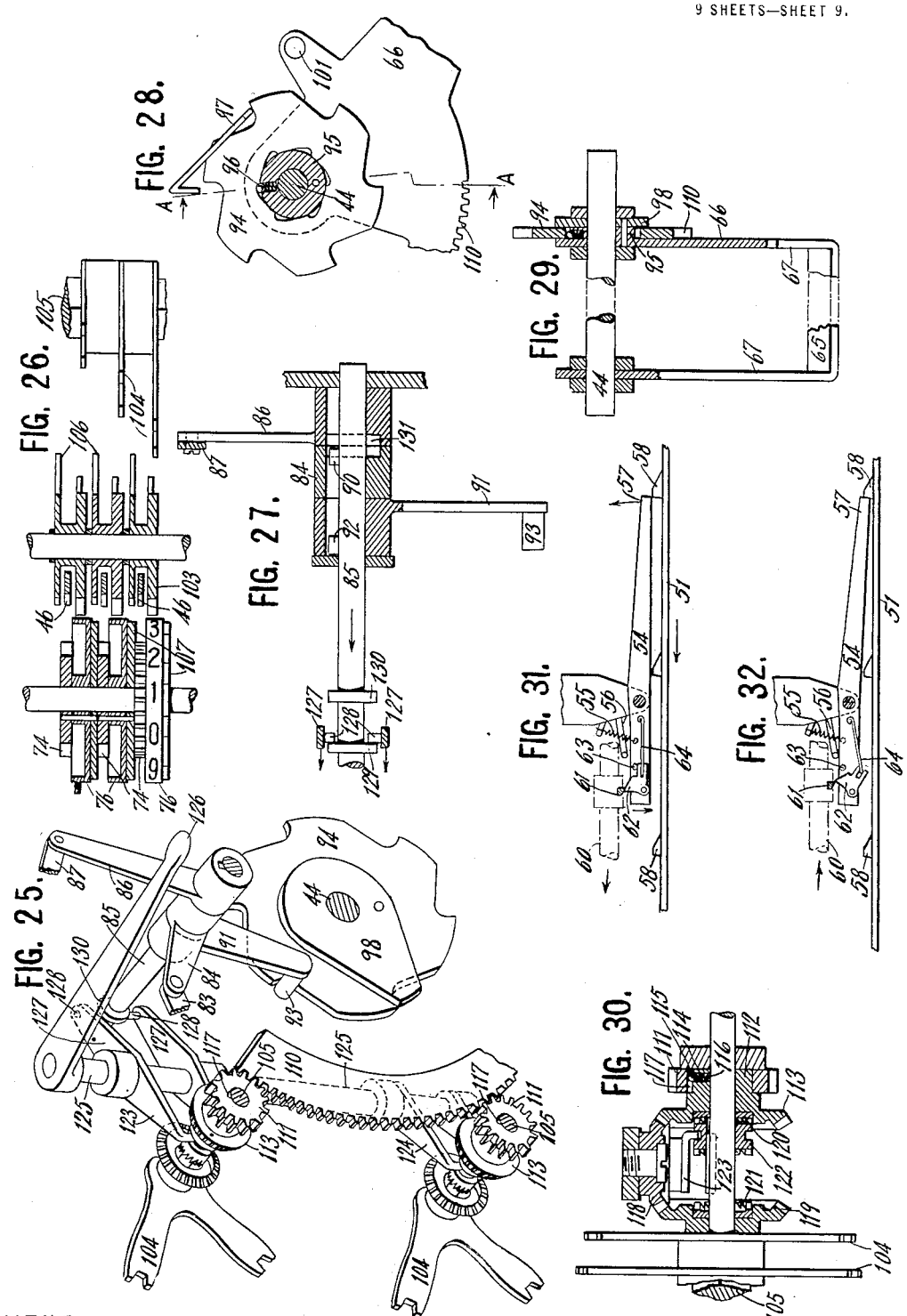
WITNESSES:
Julius Duchstine
J. A. Brophy
INVENTOR:
Burnham C. Stickney

UNITED STATES PATENT OFFICE.

BURNHAM C. STICKNEY, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,288,259.      Specification of Letters Patent.      Patented Dec. 17, 1918.

Application filed January 4, 1913. Serial No. 740,094.

*To all whom it may concern:*

Be it known that I, BURNHAM C. STICKNEY, a citizen of the United States, residing at Elizabeth, in the county of Union and State of New Jersey, have invented certain new and useful Improvements in Combined Type-Writing and Computing Machines, of which the following is a specification.

This invention relates to a combined type-writing and computing machine of the general type in which all of the digits of a number to be computed are first indexed as the digits are separately written on the work-sheet, then the number as a whole when so indexed is transferred to the computing head or heads, and is an improvement on my applications, No. 685,652, filed March 23, 1912, (now Patent No. 1,186,520, dated June 6, 1916) and No. 699,377, filed May 24, 1912.

In my above-mentioned application, No. 685,652, I showed a structure whereby a number of computing units or heads on the same level could be used successively to compute numbers in different vertical columns either for addition or subtraction.

In my above-mentioned application, No. 699,377, I showed how a secondary grand totalizer or computing head could be used in connection with a series of alined computing units or primary computing heads, to accumulate either a cross total or a grand total of the numbers computed in separate vertical columns by the series of alined computing heads. In that case, however, the mechanism was shown arranged for addition only.

In my present application, I not only provide for the use of a grand or cross totalizer with a series of alined primary computing heads for addition, but I also arrange whereby these same computing elements can be used for subtraction as well as addition.

In the above-mentioned prior applications, I also showed denominational digit column members, which transferred the indexed numbers to the computing wheels, in the form of sliding racks. In this invention, I have devised denominational column members which swing to perform the function of transferring an indexed number instead of sliding.

In carrying out these improvements, I have arranged a main or primary totalizer divided into a series of computing units or heads in axial alinement with each other on a different level from a secondary or grand totalizer, with means for accumulating the numbers to be computed in the form of swinging arcuate rack-bearing elements, which engage to drive both the primary and secondary totalizers at the same time.

The connection for driving is a direct one for addition, that is to say, the rack portions engage with the computing wheel pinions of both totalizers directly for addition. The driving connection is an indirect one for subtraction. To accomplish subtraction, floating pinions are moved up to form an intermediate connection between the racks and the pinions of the computing wheels in both totalizers. The racks, however, are out of driving connection with the computing wheel pinions at all times except when they are being swung forward in their number-transferring stroke.

Provision is made whereby the type or character of computation for all the totalizers can be controlled from a single handle or lever. Provision is also made for carrying "one" in addition and borrowing "one" in subtraction for both totalizers, and this mechanism is also governed from the controlling lever just mentioned, so as to correspond with the character of driving connection between the transferring racks and the computing wheels.

Other features and advantages will hereinafter appear.

In the accompanying drawings—

Fig. 3 is a plan view with some of the superposed elements removed to disclose the underlying structure.

Fig. 4 is a detail front view in elevation, showing the transposition mechanism whereby the several denominational or columnal or column bars of the computing mechanism are controlled in their activity in successive order during the step-by-step movement of the carriage.

Fig. 5 is a detail view in side elevation, showing one of the numeral keys depressed so as to raise the corresponding pin-setting linkage, without, however, having the pin-bearing bars in such a position that the pins thereon can be set.

Fig. 6 is a view similar to Fig. 5, showing however, one of the pin-bearing denominational bars in its active position, so that one of the pins thereon is set by the linkages associated with the depressed numeral key.

Figure 1:
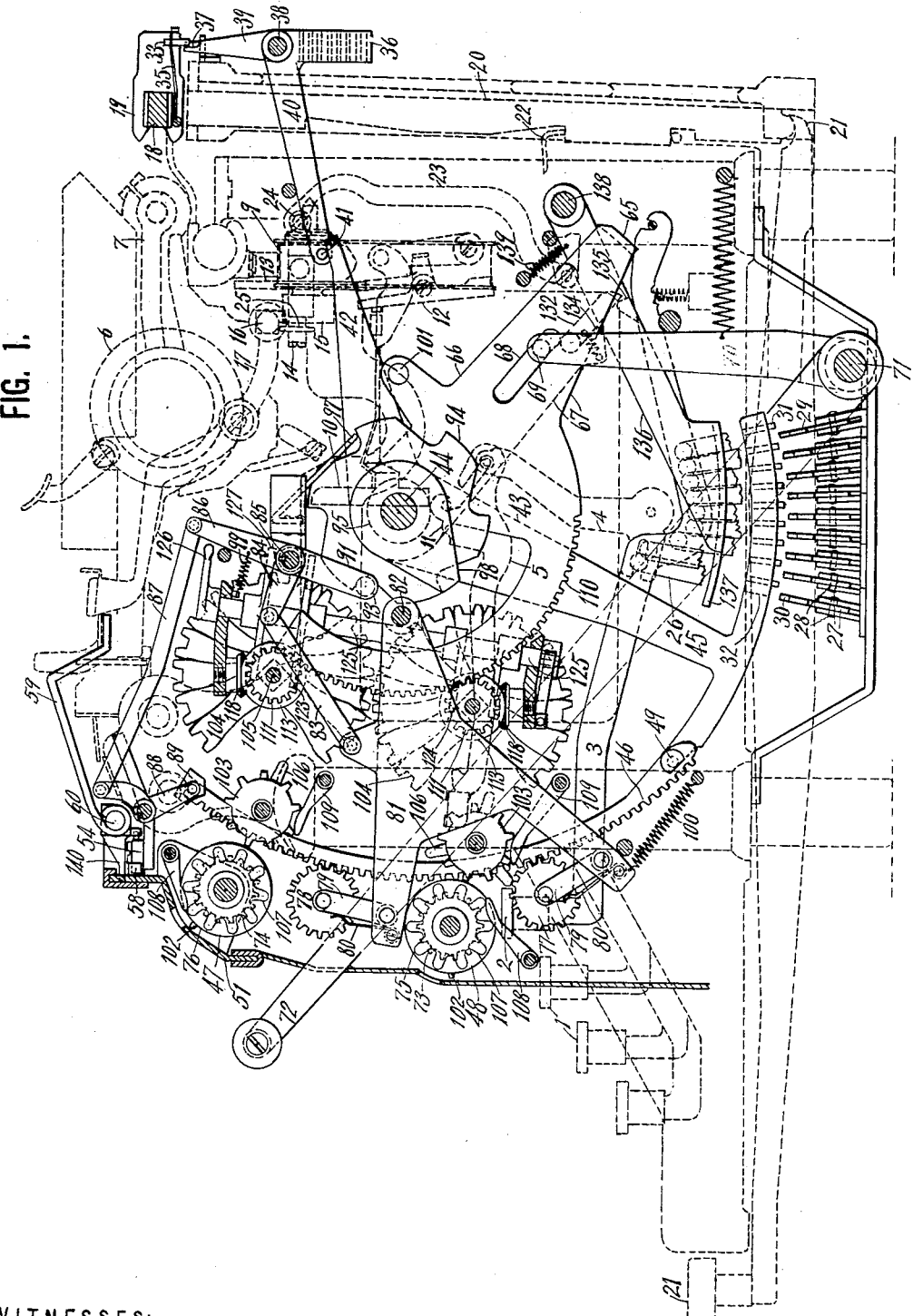
Figure 1 is a vertical section taken from front to rear, showing the parts of the type-writing mechanism in dotted and the parts of the computing mechanism in full lines, with parts omitted for the sake of simplicity.

Fig. 7 is a skeleton view showing the mechanism arranged for adding in both computing heads and with one of the pin-bearing denominational bars thrown forward its full stroke. Particular attention is called to the position of the ball clutches relative to their sockets in the tens-carrying pinions, whereby a quarter idle stroke is obtained during the return movement of the general operator before the tens-carrying mechanism becomes effective.

Fig. 8 is a skeleton view in elevation, showing the parts arranged for addition with the racks just engaging the gears of the computing wheels after the preliminary forward stroke of the general operator.

Fig. 8ª is a detail view, showing the clutch and associated pinion for one of the assisting tens-carrying shafts in its normal position.

Fig. 9 is a skeleton view in elevation, similar to those of Figs. 7 and 8, with the parts arranged, however, so that they will perform subtraction, and showing one of the pin-bearing rack bars at the end of its extreme forward stroke.

Fig. 10 is a view similar to Fig. 9, with the exception that the intermediate pinions have just engaged the dial wheel pinions for a forward or running-up movement of the rack bars.

Fig. 11 is a skeleton view in elevation, showing the parts arranged for addition and during the return stroke of the movement of the rack bars just as the cam follower has fallen from resting on the auxiliary arm, to enable the rack bars to clear the dial pinions before the racks have any return movement.

Fig. 12 is a skeleton view in elevation, showing the general operator making its return stroke, with the parts arranged for subtraction and just as the racks begin to return, subsequent, however, to disengagement of the idle pinions from the dial wheel pinions.

Figs. 13 to 20, inclusive, are detached detail views of the duplex assisting segments, showing the graded angles at which the arms thereof are arranged with respect to each other.

Fig. 21 is a detail vertical section from front to rear through a computing head, showing the tens-carrying mechanism before it has been actuated by the single tooth of the computing wheel.

Fig. 22 is a view similar to Fig. 21, with the exception that the mechanism is shown after the single tooth of the computing wheel has initiated the tens-carrying operation, which is completed by the assisting segments.

Fig. 23 is a detail view showing the restoring mechanism for restoring the pins on the pin bars after they have completed their work. This view illustrates the parts in the position which they occupy before the general operator has forced the pin bars forward to accomplish their work in running up numbers, and illustrates how the pawl on the general operator escapes the cam lug on the pin-restorer without actuating it.

Fig. 24 is a view similar to Fig. 23, showing, however, the general operator on its return stroke with the pawl thereon engaging the cam on the pin-restorer, so that the pawl has shifted the latter down to its pin-restoring position.

Fig. 25 is a skeleton perspective view showing the arrangement whereby the clutches are shifted to change the direction of drive of the tens-carrying assisting shafts so as to enable either addition or subtraction.

Fig. 26 is a plan view partly in section, showing the relation of a few of the computing or dial wheels and the tens-carrying mechanism therefor.

Fig. 27 is a detail section through the shaft which controls the character of action between the segment rack bars and the pinions of the computing wheels for addition and subtraction.

Fig. 28 is a detail sectional view in elevation, taken at right angles to the section shown in Fig. 29, showing the connection of the multiple cam, which controls the adding and subtracting states of the computing heads, to the general operator.

Fig. 29 is a vertical section on the line A—A of Fig. 28, showing the same parts from a different point of view.

Fig. 30 is a vertical section through the reversing gearing which enables the rotation of the tens-carrying shafts for addition and subtraction.

Fig. 31 is a detail view of the locking mechanism which holds the traveling computing element against movement, and the releasing mechanism therefor, whereby the main totalizer is given intermittent jump movements, one for each new major column, as the typewriter carriage travels from the computing in one column zone to the computing in another column zone. The parts in this view are illustrated with the carriage traveling to the left in a normal letter-spacing direction, showing the latch just about to be released from the dog on the traveling computing element, so that the traveling element of the computing mechanism will be free to jump forward.

Fig. 32 is a view similar to that shown in Fig. 31, with the exception that the carriage is traveling in the return direction, and illustrates how the tripper passes idly by the trip without actuating the latch.

Referring more particularly to the separate parts of this invention as embodied in the form shown in the drawings, 1 indicates character keys, and 2 numeral keys, which are mounted on key levers 3, so as to rock bell cranks 4, to swing type bars 5 up against the front side of a platen 6 mounted on a carriage 7. The carriage 7 is mounted to travel in a manner common to Underwood typewriters, and is controlled in its travel for a step-by-step letter-feeding movement by an escapement mechanism indicated in general at 9.

This escapement mechanism may be of any usual type, and in this instance is shown to include a universal bar 10 engaged by a heel 11 on each type bar as it is actuated, so as to rock a pair of pawls 12 engaging with an escapement wheel 13. The escapement wheel 13 is on a shaft 14 common to it and a pinion 15, which engages a rack 16 mounted on arms 17, which are pivotally mounted on the carriage 7, so as to enable the rack 16 to be lifted out of engagement with the pinion 15 when it is desired to have a movement other than a step-by-step movement.

To accomplish such a jump movement, the carriage 7 may have secured thereon, a rack bar 18, engaging the teeth of which may be adjustably-mounted tappets or stops 19, which are adapted to be engaged by any one of a series of vertical bars or plungers 20 engaging at their lower ends with tabulating key levers 21. The tabulating key levers 21 are connected in the usual manner to a universal bar 22, which pulls on a link 23, to rock a lever 24, so as to raise a roller 25 on the front end thereof, which engages with a smooth portion of the rack 16.

The mechanism so far described is common to the Underwood typewriter and forms no part of the present invention, but combines and coöperates with the computing mechanism which will now be described, to enable the effection of a combined typewriting and computing action.

Figure 2:
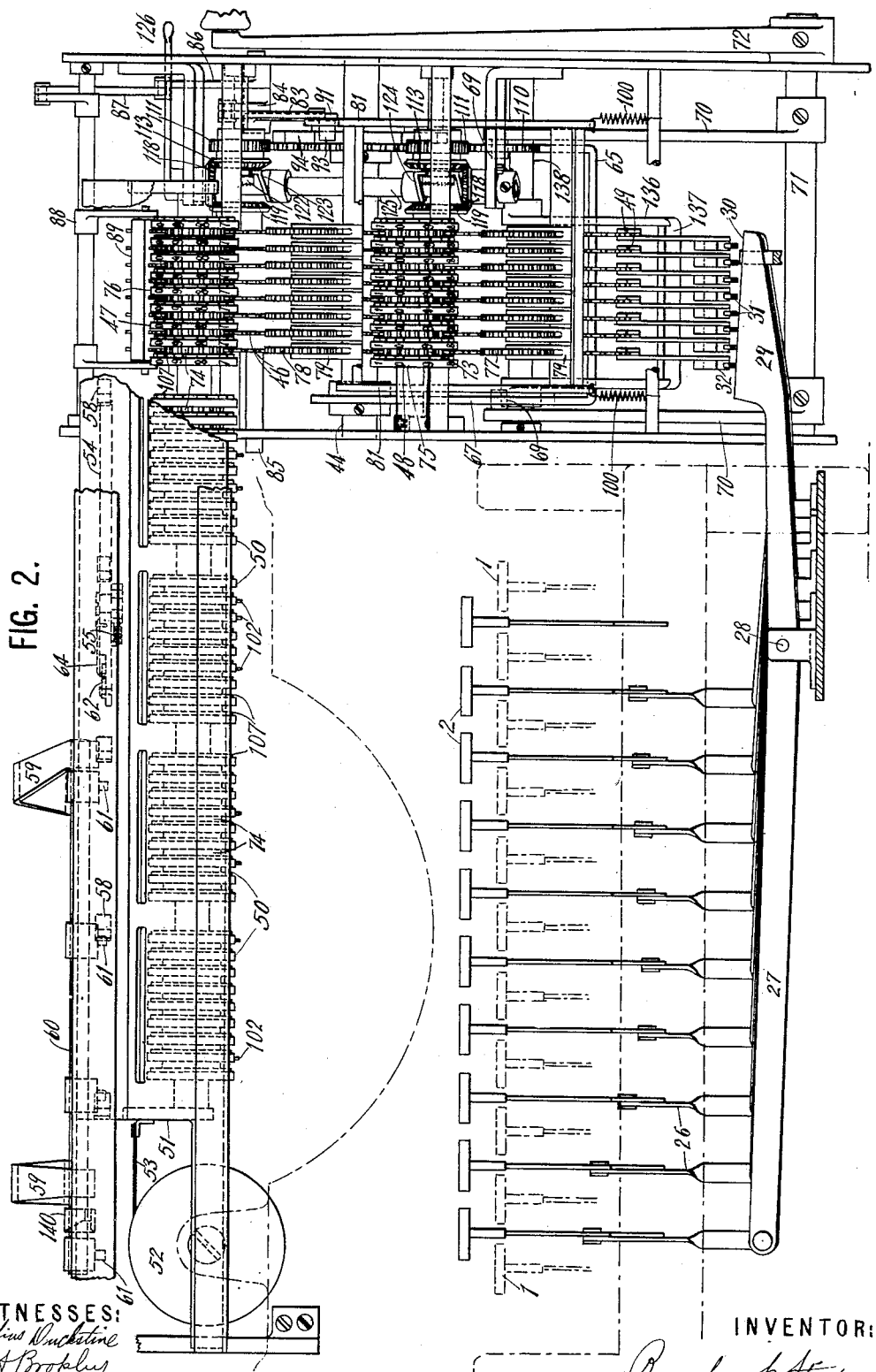
Fig. 2 is a fragmentary front view in elevation with parts broken away to show the underlying structure.

When the numeral keys 2 are struck, they not only raise the type bars to print characters, but they also, as will be seen by reference to Figs. 2 and 3, press down on thrust links 26, which are arranged in echelon and engage at their lower ends with a series of levers 27 of varying length and pivoted at varying points 28.

In depressing one end of a lever 27, it raises the opposite end which is provided with a blade 29, having its top edge (indicated at 30) slightly inclined downward from its pivot toward the extremity of this end of the lever, so as to allow for the variation in leverage. The top edge 30 of each lever is so arranged that each lever may set any one of a superposed row of pins 31, each one of which in a row corresponding to the lever, is mounted on a different denominational or digit segment member 32.

The purpose of this arrangement is to enable a numeral key when depressed to set a corresponding pin on one of the bars or members 32. Normally, however, as will be seen by reference to Fig. 5, the pins 31 are offset or out of alinement with the blades 29 of the levers 27, so that if a key should operate its associated bladed-lever, no pin would be set unless some other mechanism should move the bars 32 to bring the pins 31 into alinement with the blades 29. The purpose of this is to enable a cross selection which will cause the setting of a pin solely on the denominational member corresponding to the particular denomination being written in at the time the key is struck. To accomplish this object, the carriage which in its travel controls the printing point, is also made to control the active denominational digit member.

The same or different stops or tappets 19 which control the position of the carriage by coöperation with the tabulating mechanism, may be used to carry out the selecting movement of the denominational members. In this arrangement, as will be seen by reference to Fig. 4, each of such tappets 19 as are used for this purpose is provided with a pawl 33 pivotally mounted thereon and rigidly held from movement in one direction by a stop 34, but yieldingly permitted to move in the opposite direction by a spring 35.

In Fig. 4, is shown the carriage moving for a return stroke, so that the pawl 33 passes ineffectively by a series of transposition bails 36, but during the step-by-step movement of the carriage in the letter-feeding direction, as in the actual striking of successive digits in a horizontal row, the pawl 33 will successively engage cam edges 37 (Fig. 1), so as to rock the bails 36 successively about their pivotal mounted bearings on a shaft 38.

It will be noted that the bails 36 are nested one within the other, so that arms 39 on which the cam portions 37 are provided, will be arranged successively from right to left, while arms 40 of the same bails at the other ends thereof will be arranged successively from left to right. That is to say, the arm 39 farthest to the right will be first actuated by the pawl 33, whereby the corresponding arm on the same bail, which will be actuated at the same time, will be farthest to the left of the series of arms 40.

Each of the arms 40 is provided with a pin 41, which overlies a corresponding arm 42 of a bell crank 43. Each of these bell cranks is loosely mounted on a fixed shaft 44 and is provided on the other arm 45 thereof with one of the previously-mentioned pin-bearing bars 32, shown in this instance as in the form of a segment of a circle.

It will thus be seen that when the pawl 33 rocks one of the bails 36, the associated bell crank 43 will also be rocked, so as to bring the pins 31 carried by the denominational bar 32, in alinement with the blades 29 on the levers 27. Inasmuch as the pawl 33 can come in engagement with only one of the bails at a time, only one of the pin-bearing bars 32 will be shifted to such a position that the pins thereon can be set by the particular one of the levers 27 actuated by a depression of the corresponding numeral key.

Each of the bars 32 has as a continuation thereof, an arcuate rack bar 46, which is arranged to coöperate with a primary or main totalizer 47 and a secondary or grand totalizer 48, to run up numbers thereon. In this instance, for the purpose of convenience, the rack 46 is shown as being pivotally connected to the pin-bearing portion 32, as at 49, to enable an engaging and disengaging movement of the rack.

The pin-bearing portions of the denominational or digit column members may be considered, when taken together with the pin-setting mechanism, to constitute computation - indexing means, while the rack bars may be considered part of the transferring means for transferring the indexed computations to the totalizers. As a whole, the rack portions and pin-bearing portions of the bars may be considered a part of the actuating means for running up numbers on the totalizers.

It will be well at this point, to describe the general arrangement of the totalizers 47 and 48, to enable a subsequent clearer description of the parts for actuating the same. The grand totalizer 48 may be used to either cross add solely, or to accumulate a grand total of all cross additions. It is therefore arranged at a different level from the main totalizer 47, which, in this instance, is shown to include a series of individual units or computing heads 50, (Figs. 2 and 3) which may be used to calculate the sub-totals of corresponding vertical columns on the work-sheet.

Inasmuch as the computing mechanism is of the type in which the computation is first indexed and then transferred simultaneously to all of the wheels necessary on a single computing unit or head, it is necessary to maintain the traveling portion of the main computing totalizer stationary during the indexing and subsequent transfer, and then obtain a traveling movement to bring the next computing unit or head into coöperation with the running up and indexing mechanism between the several columns. To this end, as will be seen by reference to Figs. 2, 3, 31 and 32, the totalizer 47 is mounted on a computing frame or carriage 51, which travels relatively to the indexing and transferring mechanism, and is normally under a traction tending to draw it in a direction corresponding to the letter-feeding movement of the carriage, by a spring barrel 52, which is connected thereto by a flexible member 53. The main totalizer 47, however, is prevented from such movement by a latch lever 54, which is normally held by a spring 55 against a stop 56, in such a position that one end 57 thereof will lie in the path of the next adjacent one of a series of lugs 58 on the frame 51. This latch lever will therefore normally prevent the traveling movement of the totalizer 47 under the traction of the spring barrel 52. When, however, the initial one, that is the one farthest to the left, of the series of computing heads 50, has received a computation, it is necessary to bring the next computing head in engagement with the indexing and transferring mechanism.

Inasmuch as the carriage must also be spaced toward the left to bring a fresh column of the work-sheet to the printing point, advantage is taken of the movement of the carriage to control the movement of the computing heads 50. To this end, there is mounted on the typewriter carriage 7, a pair of brackets 59, which support between them, a rail 60, having adjustably mounted thereon at predetermined intervals corresponding to the intervals between the columns of the work to be written on the work-sheet, a series of trippers 61, which are adapted to co-act successively with a trip 62 pivotally mounted on the opposite end of the lever 54 from the end 57 which engages the lugs 58. The trip 62 has a cam edge, which is engaged by the cam edge of the tripper 61, so that as the carriage feeds in a letter-spacing direction toward the left, the lever 54 may be rocked to move the toe or end 57 out of engagement with the lug 58, permitting a jump movement of the computing heads 50 until the next lug 58 is caught by the toe 57 of the lever 54.

It will be noted that while the trip 62 is prevented by a stop 63 from a movement relative to the lever 54, when approached by a tripper 61 during a letter-feeding movement of the carriage, as in Fig. 31, it is but yieldingly held by a spring 64, so that when the same or another tripper 61 comes in engagement with the trip 62 during a return movement of the carriage, as in Fig. 32, this trip will yield, permitting the idle passage of the tripper 61 without a corresponding actuation of the latch lever 54. The series of horizontally-alined totalizers will be returned during the return movement of the carriage, by a dog 140, which engages the left-hand end of the frame 51 of the upper totalizer.

Having described the arrangement whereby the computing heads can be made to simultaneously run up numbers corresponding to the sums of different vertical and horizontal columns, the particular accumulating and transferring mechanism may now be further described in detail.

Referring to Figs. 6 to 12, inclusive, and 25, it will be seen that when the pins corresponding to a series of digits have been set up above the bars 32, these set-up pins may be engaged by a cross bar 65 of a general operator 66, which is also shown to include a pair of arms 67, between which the cross bar 65 extends. The general operator 66 is loosely mounted on the shaft 44 and has provided in both of the arms thereof, slots 68, which are engaged by pins 69 on arms 70 secured to a shaft 71, which has also secured thereon, an operating crank 72.

When it is desired to run up a number indexed by the set-up pins on the rack bars 32, the crank 72 may be swung forward from the position shown in Fig. 1 to the position shown in Fig. 9, so that the general operator will have a corresponding movement in the direction of the arrows shown in Figs. 7 and 9, whereby it will thrust the segment bars 32 in front of it, carrying the rack bars 46 with them a distance corresponding to the particular pins which have been set up on the various denominational bars 32.

It will be noted, however, that the rack bars 46 are not in a condition to engage pinions 73 and 74 of computing or dial wheels 75 and 76, comprising the totalizers 48 and 47. For addition, therefore, it is first necessary before the rack bars have any movement, to bring about the engagement of the rack bars with the pinions 73 and 74.

In the case of subtraction, instead of a direct engagement of the rack bars 46 with the pinions 73 and 74, an indirect driving relation is brought about through the intermediary of idle pinions 77 and 78, which always engage the rack bars 46 and may be shifted up, so as to also engage the pinions 73 and 74. The idle pinions 77 and 78 may be mounted on pivotal frames 79 and normally yieldingly pressed into engagement with the racks 46 by means of springs 80.

The frames 79, of which there is one for each of the idle pinions, are pivotally mounted on a rock frame 81, which is pivotally mounted on a shaft 82. The rock frame 81 is connected by a link 83 (Figs. 1, 12 and 25), to an arm 84 loosely mounted on a shaft 85 but connectible thereto by a clutch arrangement. Also loosely mounted on the shaft 85, there is provided an arm 86, which is connected by a link 87 to a bell crank 88, which is provided with a guide 89 for the rack bars 46. By swinging the bell crank 88 from the shaft 85, the engagement of the rack bars 46 with the pinions 73 and 74, may be brought about to accomplish an adding rotation of the computing wheels of both the upper and lower computing totalizers.

To accomplish a subtracting rotation of the computing wheels, the rock frame 81 may be also swung up to bring the pinions 77 and 78 into mesh with the pinions 73 and 74, the swinging movement likewise being controllable from the shaft 85. The control, however, from the shaft 85 is of an alternative character, that is to say, only one control can be effective at a time. For this purpose, the shaft 85 is shiftable through the bearings of the arms 84 and 86, and is provided with a key 90 (Fig. 27), which can be shifted from coöperation with one of the arms, to coöperate with the other of the arms, the arms being provided with key-slots into which they key can pass to secure one of the arms at a time to the shaft 85, so that it will rotate therewith. The shaft 85 itself obtains its rocking movement from an arm 91, which is likewise connected to the shaft 85 by a splined arrangement 92, but this splined arrangement is such that the key never leaves the slot, so that the arm 91 is always connected to the shaft 85 no matter which one of the arms 84 or 86 is connected to the same shaft.

The arm 91 is provided with a cam-follower 93 (Fig. 25), which is arranged to engage a multiple cam wheel 94 loosely mounted on a hub 95 of the general operator 66, but connectible thereto by a ball-and-socket clutch 96, (Fig. 28) during the forward movement of the general operator. The clutch 96, however, is of such a character that it connects the multiple cam 94 to the general operator solely during the forward movement of the latter and but for a distance corresponding to the action of one cam tooth. The cam will be held against return movement with the general operator by a detent 97. There is a clutch socket for each cam tooth, so that at each complete actuation of the general operator, a new tooth will be brought in play.

It will be noted that the formation of each cam tooth of the cam wheel 94 is such that it will first rock the arm 91 and then hold it for a period in its actuated position, so that whichever one of the arms 84 or 86 is in clutched relation with the shaft 85, the associated mechanism will be manipulated to bring about a driving relation between the racks 46 and the pinions 73 and 74.

If the arm 84 is clutched to the shaft 85 for a substracting operation, when the shaft 85 is rotated the frame 81 will be swung upwardly moving the idle pinions 77 and 78 into mesh with the pinions 73 and 74, so that the computing wheels will be driven in a subtracting direction. If, however, the arm 86 is clutched to the shaft 85, the frame 81 will remain stationary while the racks 46 are manipulated by the bell crank guide mechanism 88 and 89 into direct mesh with the pinions 73 and 74 carried by the computing wheels, so that the computing wheels will be rotated in an adding direction.

It will be noted in passing, that all of the movement of the cam-follower in rising on the incline to the unacting circular portion of the cam wheel, takes place before the cross bar 65 comes into engagement with any of the set pins 31 on the denominational members 32, so that the rack bars will have absolutely no running-up movement until they are connected either for adding or subtracting. It is likewise necessary, after the rack bars have been given as much of a forward movement as is possible under the circumstances, that they shall be disconnected before they are given a return movement, so that they will not undo any running up of numbers on the computing wheels which they have accomplished on their forward stroke.

For this purpose, there is secured to the general operator 66 to move therewith, an auxiliary rest or arm 98. This arm 98, as will be seen by reference to Fig. 29, is secured to the hub 95, so that unlike the cam wheel 94, it not only moves forward and up with the general operator, but returns with the general operator leaving the multiple cam wheel behind it.

At the beginning of the movement of the general operator on its forward stroke, the rest or arm 98 occupies the position shown in Fig. 1. That is to say, the resting portion of this arm is concentric and co-extensive with the resting portion of the next active cam tooth of the multiple cam wheel 94, so that it forms a continuation thereof at the point where this cam tooth drops down for the beginning of the next cam rise. The follower 93 will therefore be lifted to the highest surface of the cam wheel and continue along this surface with the subsequent forward movement of the general operator, and during the final movement will stop on the rest 98, so that it will overlie the next dip between two adjacent cam teeth. Then when the general operator subsequently returns, carrying with it the rest 98, the follower will be free to drop in this dip under the tension of a spring 99, which returns the arm 86, or a spring 100, which returns the rock frame 81, according to whether the arm 86 or the arm 84 is clutched to the shaft 85.

The return movement of the general operator, which takes place before the rest 98 has moved from under the cam-follower to permit it to disconnect the transferring mechanism from the pinions 74 and 73 of the upper and the lower computing heads, is less than the distance which the general operator must travel to bring a returning cross bar 101 thereon into engagement with the arms 42 of the bell cranks 43, which are connected to the denominational pin-bearing bars 32. There is, of course, a sufficient play between the arms 42 and the bar 101, so that when the denominational members are returned to normal position, they may be adjusted in a manner previously described, to bring the pins 31 thereon in alinement with the levers 27.

In order to carry or borrow tens between one computing wheel and the next adjacent computing wheel, there is provided a carry-over mechanism for the upper totalizer and also a carry-over mechanism for the lower totalizer. On each of the computing wheels 75 and 76, as will be seen by reference to Figs. 21 and 22, there is provided a special tooth 102, which is adapted once in every complete revolution of the associated computing wheel, to engage with one of the teeth of a mutilated gear 103 and rotate this mutilated gear through one-ninth of a revolution. The mutilated gear 103 has nine teeth, every third one of which is cut away for a fraction of its width, so as to leave a blank or mutilated space, which is normally opposed to an associated duplex assisting segment 104. When the tooth 102, however, rotates the mutilated gear through one-ninth of a revolution, it brings one of the complete or wide teeth on the mutilated gear into the path of one of the arms of the segment 104.

It will be seen that it makes no difference whether the computing wheels are rotated for addition or subtraction, as they will oscillate the mutilated gears 103 either one way or the other, to bring one of the teeth bordering the gap of the mutilated teeth into the path of one of the arms of the assisting segment 104. The assisting segments 104 are secured to a shaft 105, which is rotated in one direction or the other according to whether the operation is an adding or a subtracting one. At any rate, when a full tooth of a mutilated gear 103 is brought into the path of the assisting segment 104, the latter will be rotated in a manner to be described, so as to rotate the mutilated gear two-ninths of a revolution, making in all one-third of a revolution.

Each mutilated gear 103 is fixed to a three-tooth pinion 106, which extends so as to mesh with a ten-tooth gear 107 secured to the computing wheel of next higher denomination. It will thus be seen if a computing wheel is rotated to carry over ten from a lower to a higher denomination, that through the assistance of a mutilated gear 103, the assisting segment 104 and the three-tooth gear 106, the next higher computing wheel will be advanced a space corresponding to one digit. In subtraction the converse is true and the next higher computing wheel will be rotated backward a space corresponding to one digit, so as to borrow one from the next higher denomination.

The particular structure of the assisting segments 104 will be seen by reference to Figs. 13 to 21, inclusive. Each segment comprises an adding and a subtracting arm, and the arms when assembled on the shaft 105 are arranged in two spirals, one for adding and one for subtracting, whereby the carry-over operation, whether for carrying one or borrowing one, will start with the units wheel and progress toward the wheels of higher denomination in succession.

It has been found convenient to form each adding and subtracting arm for each computing wheel integral to provide a duplex assisting segment. Inasmuch as the arms must operate successively, the angle at which a pair of arms is arranged gradually increases in magnitude from that of the assisting segment for the units computing wheel to that of the computing wheel of the highest denomination provided for. In Fig. 20, the angle has become 360 degrees, so that a single arm performs both the adding and subtracting assisting operation for the computing wheel of highest denomination. The usual detents 108 and 109 (Fig. 22) may be provided, respectively, for the computing wheels and the mutilated gears 103, to prevent the accidental rotation of these members and to lock them in any adjusted position.

The shaft 105, of which there is one for each tens-carrying train, that is, for the upper and lower totalizers, is arranged to be driven solely during the return movement of the general operator, as the numbers must be first run up on the computing wheels during the forward stroke of the general operator, and by their running-up set the tens-carrying mechanism to be operated through the assisting segments on the subsequent return movement of the general operator.

To accomplish this, one of the arms 67 of the general operator is provided with a gear segment 110, which meshes with pinions 111 on each of the assisting shafts 105. The pinions 111, however, are not secured to the shafts 105, but are connectible thereto so as to enable a rotation in either one direction or the other, according to whether the operation is an adding or a subtracting one, solely during the return stroke of the general operator 66 and the gear segment 110.

Inasmuch as the operations for both assisting shafts are identical, only one will be described. By referring to Figs. 7, 8, 8ᵃ, 11, 12, 25 and 30, it will be seen that the pinion 111 is loosely mounted on the hub 112 of a bevel gear 113, the latter being also loosely mounted on the shaft 105. The pinion 111, however, is arranged to be clutched to the bevel gear 113 by a ball-and-socket clutch 114, which consists of a ball or roller 115, normally pressed out by a spring 116, so that it tends to enter a socket 117 in the pinion 111. When the pinion is rotated in the direction of the arrow in Figs. 11 and 12, the ball or roller 115 will form an interponent clutching the pinion to the hub 112, as indicated in Figs. 11 and 12, so that the pinion will rotate the bevel gear 113 with it.

As has been stated above, it is necessary before the tens-carrying operation is assisted on the return stroke of the general operator, to move the racks 46 out of driving relation with the computing wheels 75 and 76, so that the tens-carrying operation will not be interfered with. To allow for this, the pinions 111, being always in engagement with the arcuate rack or segment gear 110, must be given an idle motion during the return movement of the general operator as well as during the forward movement of the general operator. To this end, the clutch when in its normal position, has its parts located according to the arrangement shown in Fig. 8ᵃ, that is, with the ball or roller 115 out in the socket in the pinion 111.

The extent of movement of the general operator on its forward stroke and the relative driving ratio between the segment gear 110 and the pinions 111, are such that during the forward movement of the general operator, the pinions 111 will be given not only a complete revolution, but a movement somewhat in excess of a complete revolution. For example, as shown, an additional quarter of a revolution, so that the socket 117 will be passed idly by the ball or roller 115 a revolution and a quarter, until it occupies the position shown in Fig. 7. Under this state of affairs, the sockets 117 will permit the pinions 111 to rotate idly during the return movement of the general operator a quarter of a revolution before the shafts 105 are given any motion whatsoever. This gives plenty of time for the rest 98 to pass from beneath the follower 93, so that whether the mechanism is connected for adding or subtracting, the computing wheels will be freed therefrom before any assisting carry-over operation can take place.

The pinions 111 are effective always on the return stroke of the general operator and rotate the bevel gears 113 always in the same direction, but they do not rotate the shafts 105 always in the same direction. The bevel gear 113 meshes with an idle bevel gear 118, (Fig. 30) which in turn meshes with a bevel gear 119 also loosely mounted on the shaft 105 but facing in the opposite direction to the bevel gear 113. The bevel gears 113 and 119 have thereon clutch faces, numbered, respectively, 120 and 121, which are arranged to be engaged by a shiftable duplex clutch 122, splined on the shaft 105 between them, so that whichever one of the gears 113 and 119 is engaged by the clutch 122, it will be secured to the shaft 105, so as to rotate the latter. Inasmuch as the gears 113 and 119 face in opposite directions, the one will rotate the shaft 105 in one direction and the other in the opposite direction, that is to say, one will rotate for addition and the other for subtraction.

The clutch 122 is provided with an annular groove, which for the upper totalizer is engaged by a shifting lever 123, and for the lower totalizer by a shifting lever 124, both of which are secured to a vertical shaft 125. The shaft 125 has secured thereon, a manually-operable handle or lever 126, which may be termed a controlling lever, inasmuch as it controls the state of the totalizers as to the character of operation carried on thereby, that is to say, as to an adding, subtracting, or neutral state.

It will be noted in this connection, that the controlling handle 126 not only controls the position of the clutches 122 to determine the state of the assisting driving shafts 105, but also controls the position of the shaft 85 to determine which of the arms 84 or 86 shall be connected in clutched relation with the shaft 85. To this end, the control shaft 125 has secured thereon, one or more arms 127, which have pins 128 engaging between collars 129 and 130 secured on the shaft 85, so that when the lever 126 shifts the clutches 122 to any one of their positions, it will also shift the shaft 85, so as to change the position of the keys 92 and 90, and more especially the latter. The key 92 always remains in the slot of the lever 91, so that this lever is always connected in driving relation with the shaft 85. The key 90 can, however, occupy one of three positions, that is, it can occupy a position in the slot in the lever 84, corresponding to a subtracting operation it can be shifted to an extreme position in the slot on the lever 86, corresponding to an adding state of the mechanism or it can occupy an intermediate position, in which it will rotate idly in an annular groove 131 formed by annular sockets in the facing sides of the hubs of the levers 84 and 86, the last-named position corresponding to the neutral state of the computing mechanism, wherein neither of the totalizers will be connected in driven relation with the racks 46, even if pins should be set up thereon and the general operator oscillated by the crank 72. The clutch 122 is, of course, of sufficient smallness to permit it to occupy an intermediate position without connecting either of the gears 113 or 119 in driving relation with the shaft 105.

After the set pins have performed their work in enabling the general operator to advance the denominational members with their racks distances corresponding to the particular pins set, it is necessary to restore the pins to their original position, so that subsequent combinations of digits can be indexed thereon. To accomplish this, there is pivotally mounted on the general operator 66, an actuating pawl 132, which is normally held against a stop 134, but which is capable, as will be seen by reference to Figs. 23 and 24, to swing out to the Fig. 23 position against the tension of a spring 133, to avoid a lug cam 135 on a pin-restorer 136 during the forward or initial stroke of the general operator. During the return stroke of the general operator, however, the pawl 132, which is provided with a camming end, will engage the cam surface of the lug 135 and force the pin-restorer down from the Fig. 23 position to the Fig. 24 position, so that a cylindrical restoring plate 137 on the pin-restorer 136 will be forced down in contact with the upper edges of all the pin-bearing bars 32, so as to return any such pins as may be set to their unset position. The pin-restorer is pivotally mounted at 138 and will be returned by a spring 139 (Fig. 1) to its raised position after the pawl 132 has passed the cam lug 135.

In the operation of the device, the typewriter carriage 7 is started at its right-hand position with the initial one of the computing heads 50 in register with the computation-accumulating and transferring mechanism. The numeral keys will then be struck to print on the work-sheet carried by the carriage, a series of digits comprising the number to be computed. As the carriage moves step by step to the left in enabling the successive printing of the different digits of the number, a tappet 19 thereon causes a successive rocking of the bails 36, so as to successively bring the pins on the several denominational bars 32 in register with the blades 29 of the levers 27, which are actuated by the numeral keys. This enables the numeral keys to simultaneously set up pins corresponding to their values when they print their values in the several columns.

After an entire number has been indexed in this way, the crank 72 can be swung forwardly from its Fig. 1 position to its Fig. 9 position. As the bell crank is swung, it will rock the general operator forward so that the bar 65 thereon will pick up the several denominational members 32 at varying points in its travel, according to the particular pins which are set up thereon. Before, however, the general operator picks up any of the denominational bars, the cam wheel 94 will force the follower 93 up to a point where it rides evenly on the circular portion of the acting tooth. This will enable the connection of the racks 46 to both the upper and lower totalizers before the racks start in motion. The character of the connection will depend entirely on the position of the controlling lever 126. If it is positioned for an adding action, then the key 90 will be in the slot of the lever 86, so that the latter will be oscillated to manipulate the guide 89 in order to bring the racks 46 directly into engagement with the pinions 73 and 74. The idle pinions 77 and 78 yield outwardly against the tension of their springs 80.

If, however, the control lever 126 is shifted for subtracting, then the key 90 will be coöperating with the lever 84, so as to clutch it to the shaft 85, whereby the movement of the follower 93 on the cam will cause the arm or lever 84 to rock bringing the frame 81 up, so that it carries the idle pinions 77 and 78 into mesh with the pinions 73 and 74 of the computing wheels. This will enable an indirect connection between the racks 46 and the pinions 73 and 74, so that the computing wheels will be rotated in a direction for subtraction.

The position of the lever 126 controls in addition to the character of drive of the computing wheels 75 and 76, the direction of drive of the assisting shafts 105, by shifting the clutches 122 to correspond with the direction of drive of the computing wheels by the racks 46.

Whether the controlling lever 126 is set for addition or subtraction, the connection will be made before the cross bar 65 of the general operator comes into engagement with any of the pins on the denominational column bars, so that as soon as the movement of any rack bar is started by the general operator, it will be in condition to rotate both the upper and lower totalizers for either adding or subtracting according to the position of the lever 126. As the general operator 66 moves forward, the pinions 111 on the tens-carrying assisting shafts 105 are rotated idly a revolution and a quarter, so that the sockets 117 stand a quarter of a revolution in advance of the balls or rolls 115.

The general operator in its forward movement not only carries the cam wheel 94 with it, but also carries the auxiliary rest 98 along with it, and this rest is so located relatively to the cam wheel 94, that it will bridge or block the next succeeding drop or notch in the cam wheel, so that during the final stroke forward of the general operator, the cam-follower 93 instead of resting on the cam wheel 94 itself will ride on the rest 98. On the initial return motion of the general operator, the cam wheel 94 will be held from return movement by the detent 97, as the clutch 96 does not connect the cam wheel 94 to the hub 95 of the general operator, except for forward movement. The rest 98, however, is secured rigidly to the general operator, so that it will return and pass from under the cam follower 93, permitting it to drop into the next socket in the cam wheel 94 before the returning cross bar 101 comes into engagement with any of the arms 42 which form a part of the denominational column members.

It will thus be seen that whether the mechanism is set for addition or subtraction, one or the other of the springs 99 or 100 will act to bring about the disconnection of the racks 46 from driving relation with the computing wheels 75 and 76, either by moving the racks 46 directly out of mesh with the pinions 73 and 74, as in the case of adding, or by dropping the pinions 77 and 78 out of mesh with the pinions 73 and 74, as in the case of subtracting. At any rate, the rack bars 46 will be operatively disconnected from both totalizers, so that they can now be returned by the universal bar 101 without undoing any of the running-up of numbers which they have accomplished on the forward stroke of the general operator.

During this initial disconnecting portion of the movement of the general operator 66, the pinions 111 of the tens-carrying mechanism have been rotated idly for a quarter of a revolution until the sockets 117 have caught up with the rolls 115 of the clutches, when there will be formed an operative connection between the pinions 111 and the bevel gears 113.

If the clutches 122 are shifted for addition, the shafts 105 will be rotated in the direction of the arrow on the segments 104 in Fig. 11 or counterclockwise, so that the segments will act on the opposed mutilated gears 103 and carry over from such computing wheels as have passed from "9" to "0", one unit to the next higher computing wheel. On the other hand, if the clutches 122 are located for subtraction, the shafts 105 will be rotated in the opposite direction, so that the segments will be rotated in the direction of the segment arrow in Fig. 12 or clockwise. This will enable the borrowing of one from a wheel of higher denomination by any such wheel as has passed from "0" to "9" on the initial or forward stroke of the general operator.

Toward the end of the return movement of the general operator 66, the pawl 132 carried thereby, which has passed idly by the lug 135 on its forward stroke, will abut against the lug 135 and cam down the pin-restorer 136, so that the plate 137 thereof will unset any such pins as have been previously set up and have finished the work for which they were set up. As the pawl 132 passes the lug 135, the spring 139 will return the pin-restoring plate to its raised position, enabling the subsequent setting of any of the pins 31.

When the general operator comes to rest, the weight of the denominational members 32 will carry the arms 42 slightly clear of the universal returning bar 101, so that the pins 31 will be carried slightly beyond the blades 29 to the position shown in Fig. 5, whereby none of the pins can be set until the particular denominational column members on which they are located are shifted to the Fig. 6 position by one of the tappets 19 engaging with the bail 36 corresponding thereto.

When the first number comprising, possibly, several digits has been thus indexed and transferred not only to the first computing head but also to the grand totalizer 48, one of the tabulating keys 21 is actuated to move the work-sheet carried by the carriage so as to bring the next column to the printing point. As the carriage jumps forward, one of the trippers 61 will engage the trip 62, so as to cam the same away from it, and thus oscillate the latch lever 54 to remove the toe 57 thereof from engagement with the lug 58. This will permit the computing head carriage or frame to spring forward under the traction of the spring barrel 52, until the next lug 58 is caught by the latch 54. During this movement, the initial computing head will be moved to the left and the next computing head brought into working relation, although not actual engagement, with the computation-indexing and transferring mechanism. When this has been arranged, the numeral keys can be again struck to index a new number which can be subsequently transferred either for addition or subtraction to the worksheet.

Variations may be resorted to within the scope of the invention, and portions of the improvements may be used without others.

Having thus described my invention, I claim—

1. The combination, with a plurality of superposed totalizers, each including a series of number-bearing computing wheels; of a series of substantially vertical racks for simultaneously driving the wheels of like denomination in all of said totalizers so as to run the same number into all of them at the same time, each of said racks having a substantially horizontal rearwardly-extending driving member connected to its lower end; indexing mechanism associated with and located adjacent to said driving members; and a general operator engageable with said driving members for swinging said racks endwise to extents determined by said indexing mechanism.

2. The combination, with a plurality of superposed totalizers, each including a series of number-bearing computing wheels; of a series of substantially vertical racks for simultaneously driving the wheels of like denomination in all of said totalizers so as to run the same number into all of them at the same time, each of said racks having a substantially horizontal rearwardly-extending driving member connected to its lower end and provided with a plurality of devices settable thereon to determine the extent of movement of said members and their connected racks; means located adjacent said driving members for setting said devices; and a general operator engageable with the set devices, to swing the corresponding racks endwise to the extents so determined.

3. The combination, with a plurality of superposed totalizers, each including a series of number-bearing computing wheels; of a series of substantially vertical racks for simultaneously driving the wheels of like denomination in all of said totalizers so as to run the same number into all of them at the same time; a substantially horizontal rearwardly-extending driving bar pivoted at its forward end to the lower end of each rack, said racks shiftable relatively to said bars to effect a driving relation between the racks and said wheels; means for shifting said racks and a general operator directly engageable with said bars for swinging said racks endwise.

4. In a computing machine, the combination with a totalizer having numeral wheels, of actuating means for said wheels including pivotally-mounted segments, indexing devices carried thereby, and arcuate racks pivoted thereto, said racks movable to and from engagement with the totalizer wheels, a general operator, and means controlled thereby for engaging the indexing devices to swing said segments and racks extents determined by the indexing devices.

5. In a computing machine, the combination with a totalizer having numeral wheels, of actuating means for said wheels including pivotally-mounted segments, indexing devices carried thereby, and arcuate racks pivoted thereto, said racks movable to and from engagement with the totalizer wheels, a general operator, means controlled thereby for engaging said indexing devices to swing said segments and racks extents determined by said indexing devices, and means also controlled by said general operator to move said racks into engagement with said totalizer wheels.

6. In a computing machine, the combination with a totalizer having numeral wheels, of a series of racks for driving said wheels, said racks being normally disengaged from driving relation with said wheels, a cam member, means controlled from said cam member for effecting driving relation between said racks and said wheels for driving said wheels in one direction, and means also controlled from said cam member for effecting driving relation between said racks and wheels in the reverse direction, the driving stroke of said racks being always in the same direction.

7. The combination with a plurality of vertically-displaced totalizers, each having a series of computing wheels, of racks common to all of said totalizers for rotating the wheels thereof, operating means for swinging said racks endwise to effect a rotation of the wheels of all of said totalizers, a series of floating idle pinions individual to each of said totalizers, and means for concomitantly moving said series of idle pinions intermediate said racks and said wheels to form a reversing driving connection between said racks and said wheels.

8. The combination with a plurality of vertically-offset totalizers, of a series of racks common to all of said totalizers, each of said totalizers including a plurality of computing wheels with pinions individual to each wheel, a series of idle pinions individual to each of said totalizers, and a frame carrying all of the series of said idle pinions to move the idle pinions concomitantly intermediate said racks and said pinions of said computing wheels, to effect a driving connection between the common racks and all of said totalizers.

9. The combination with a plurality of vertically-offset totalizers, of actuating racks common to all of said totalizers, each of said totalizers including a series of computing wheels with pinions individual to said wheels, a rock frame, supporting frames pivotally mounted on said rock frame, and a series of idle pinions for each of said totalizers mounted on each of said supporting frames and meshing with said racks, said rock frame being movable to bring said idle pinions into mesh with the pinions of said computing wheels to effect a driving connection between all of said totalizers and said racks common thereto.

10. The combination with a plurality of vertically-offset totalizers, of actuating racks common to all of said totalizers, each of said totalizers including a series of computing wheels with pinions individual to said wheels, a rock frame, supporting frames pivotally mounted on said rock frame, a series of idle pinions for each of said totalizers mounted on each of said supporting frames and meshing with said racks, said rock frame being movable to move said idle pinions into mesh with the pinions of said computing wheels to effect a driving connection between all of said totalizers and said racks common thereto, spring means engaging said supporting frames to yieldingly hold said idle pinions in mesh with said racks, and shifting means for adjusting the position of said racks to bring about a direct connection of said racks with the pinions of said computing wheels, said idle pinions giving way to permit said movement.

11. The combination with a plurality of totalizers, each including a series of computing wheels with pinions therefor, of a series of racks common to all of said totalizers, separate series of idle pinions individual to each totalizer meshing with said racks and having one pinion for each pinion of said totalizer, automatic means for bringing about either the direct connection of said racks to the pinions of said computing wheels, or the indirect connection of said racks to the pinions of said computing wheels, through the intermediary of said idle pinions, said automatic means including a member common to both the series of racks and the series of idle pinions, and state-controlling means for governing the selection of said automatic means.

12. In a computing machine, the combination with a totalizer, of a series of pivotally-mounted segments for actuating said totalizer, one segment for each denomination, each segment having an arcuate portion bearing a series of indexing devices and a radial arm, means for setting the indexing devices to determine the amount of movement of said segments, and means coöperating with said radial arm to effect denominational selection of any segment by rendering the indexing devices thereof operable by said setting means.

13. The combination with a totalizer, including a plurality of computing wheels, of members for rotating said wheels to run up computations thereon, each of said members having a series of settable pins, a series of numeral keys, and levers connected to said numeral keys, each of said levers having a blade to engage with one of a line of said pins located on the several members.

14. The combination with a totalizer including a plurality of computing wheels, of members for rotating said wheels to run up computations thereon, each of said members having a series of settable pins, a series of numeral keys, and levers connected to said numeral keys, each of said levers having a blade to engage with one of a line of said pins located on the several members, each of said levers being pivoted intermediate its ends and the blade having an inclined pin-engaging edge to allow for the difference in leverage for the different locations of the several pins which each blade is capable of engaging.

15. The combination with a totalizer, of swinging actuating members for running up numbers on said totalizer, each of said members having a series of settable radially-disposed pins, numeral keys, and levers actuated by said numeral keys and having blades disposed radially to conform to the radial disposition of said pins and overlapping several of said members so that each blade may set a pin on more than one member.

16. The combination with a series of computing wheels, of computing-wheel-rotating mechanism including a series of swinging bars having settable pins thereon, and a general operator for engaging said pins to advance said bars, said general operator being pivotally mounted to swing about the same axis as said pin bars and comprising a pair of side arms and a cross bar to engage said pins when set, said cross-bar moving in a path parallel with and adjacent to the path in which said pin bars move.

17. The combination with a plurality of computing wheels, of computing-wheel-actuating means for running up numbers on said computing wheels including a series of bars, each having a plurality of pins settable thereon to determine the extent of movement of said bars and also having arms projecting so as to be capable of extending in substantial alinement with each other, and a general operator arranged to reciprocate said bars, said general operator being pivotally mounted to rotate and comprising a pair of side arms, a cross bar connecting said side arms and arranged to engage set pins, and a universal bar extending transversely of said first-mentioned arms so as to engage the same to return said first-mentioned bars after they have been advanced by said general operator.

18. The combination with a plurality of computing wheels, of computing-wheel-actuating means comprising a series of swinging arcuate members actuable to run up numbers on said computing wheels, a pivotally-mounted general operator mounted to swing about the same axis as said members and including a pair of slotted side arms and a cross bar connecting said side arms, a pair of arms having pins extending into the slots of said first-mentioned arms, and a crank connected to oscillate said last-mentioned arms so as to swing said general operator about its pivot.

19. The combination with a plurality of totalizers, of actuating means for running up numbers on said totalizers, carry-over mechanism for each of said totalizers, each of said carry-over mechanisms including an assisting shaft rotatable in either direction and having a plurality of duplex segments thereon arranged so as to effect a carrying or borrowing action for either addition or subtraction, according to the direction of rotation of said shafts, a rack common to all of said assisting shafts for rotating the same simultaneously, and a device associated with all of said shafts for changing the direction of rotation thereof simultaneously.

20. The combination, with a plurality of superposed totalizers, and carry-over mechanisms therefor; of racks movable in a vertical plane for driving said totalizers simultaneously, racks for driving said carry-over mechanisms simultaneously; and a general operator for swinging all of said racks simultaneously from their lower ends to drive them endwise.

21. The combination, with a plurality of superposed totalizers, and carry-over mechanisms therefor; of endwise movable racks for driving said totalizers simultaneously, racks for driving said carry-over mechanisms simultaneously; horizontally-movable devices connected with the first-named racks for controlling the extent of movement thereof; and a general operator for swinging said controlling devices and the second-named racks simultaneously.

22. The combination, with a plurality of superposed totalizers, and superposed carry-over mechanisms therefor; of means for driving said totalizers simultaneously; a vertically movable rack spanning said carry-over mechanisms for actuating them simultaneously; and a common means for actuating said driving means and said rack.

23. The combination, with a plurality of superposed totalizers, and superposed carry-over mechanisms therefor; of means for driving said totalizers simultaneously; a general operator for actuating said driving means; and a vertically movable rack formed integral with said general operator and spanning said carry-over mechanisms for operating the latter simultaneously.

24. The combination, with a plurality of superposed totalizers, and superposed carry-over mechanisms therefor; of vertically movable racks spanning said totalizers for driving the same simultaneously; a general operator for driving said racks; and a vertically movable rack formed integral with said general operator and spanning said carry-over mechanisms for operating the latter simultaneously.

25. The combination with a carry-over mechanism, of vibrating driving means for said carry-over mechanism, and a one-way clutch connection between said driving means and said carry-over mechanism being ineffective to connect said driving means for said carry-over mechanism during one entire stroke thereof and also being effective to connect said driving means with said carry-over mechanism solely during a fraction of the other stroke thereof.

26. The combination with a carry-over mechanism, of vibrating driving means for said carry-over mechanism, and a one-way clutch connection for enabling said driving means to actuate said carry-over mechanism, said one-way clutch connection having a joining point at which the parts thereof are effective during a movement of said driving means in a return direction, to connect said driving means with said carry-over mechanism, but said one-way clutch however being ineffective during the forward stroke of said driving means, the magnitude of movement of said driving means being such as to move the parts of said one-way clutch to such an extent on the initial ineffective stroke of said driving means that they will be moved beyond the effective point of connection a considerable distance, so that during the initial portion of the return stroke of said driving means said one-way clutch connection will be ineffective to connect said driving means with said carry-over mechanism.

27. The combination with a carry-over mechanism, of vibrating driving means for said carry-over mechanism, and a driving connection between said driving means and said carry-over mechanism ineffective during the initial stroke of said driving means to connect said driving means with said carry-over mechanism and having a lost motion during the return stroke of said driving means to enable a partial ineffective return movement of said driving means.

28. The combination with a totalizer, of actuating means for running up numbers on said totalizer, a carry-over mechanism for said totalizer, a general operator for imparting motion to said actuating means, said actuating means being arranged to be effective solely during a portion of the movement of said general operator, and driving connections between said general operator and said carry-over mechanism effective during a portion of the movement of said general operator other than that in which said actuating means is effective, said driving connections being also ineffective for a slightly greater period to enable the disconnection of its actuating means from said totalizer before said carry-over mechanism comes into play.

29. The combination with a totalizer, of actuating means for running up numbers on said totalizer, and means for determining the effective connection of said actuating means to said totalizer including a shifting means and a cam for actuating said shifting means and maintaining the connection of said actuating means with said totalizer during the effective period of operation of said actuating means, and a rest for taking up the work of said cam after the same has passed to a point tending to release said actuating means from connection with said totalizer.

30. The combination with a totalizer, of actuating means for running up numbers on said totalizer, means for determining the connection of said actuating means with said totalizer, a rest for taking up the work of said last-mentioned means where it leaves off, and a general operator for manipulating said actuating means, said rest being connected to said general operator, so as to drop the work assumed to enable the operative disconnection of said actuating means from said totalizer before said general operator returns said actuating means after having moved the same forward to run up numbers on said totalizer.

31. The combination with a totalizer, of actuating means for running up numbers on said totalizer, a member for effecting the connection of said actuating means with said totalizer, a rest for maintaining said connection, and means for moving said rest out of the way after said actuating means has completed its action.

32. The combination with a totalizer, of actuating means for running up numbers on said totalizer, shifting means for determining the operative connection of said actuating means with said totalizer, a multiple cam for manipulating said shifting means, said cam having a plurality of points corresponding to the disconnection of said actuating means from said totalizer, and a member for blocking said disconnecting points so as to maintain the connection of said actuating means with said totalizer beyond the capacity of said cam.

33. The combination with a totalizer, of actuating means for running up numbers on said totalizer, shifting means for determining the operative connection of said actuating means with said totalizer, a multiple cam for manipulating said shifting means, said cam having a plurality of points corresponding to the disconnection of said actuating means from said totalizer, a member for blocking said disconnecting points so as to maintain the connection of said actuating means with said totalizer beyond the capacity of said cam, and a general operator for moving said member with said cam and returning said member while said cam remains in its advanced position.

34. The combination with a totalizer, of computing means for running up numbers on said totalizer, shifting means for determining the connection of said actuating means with said totalizer, a multiple cam for manipulating said shifting means, a general operator for said actuating means, said cam having a plurality of points corresponding to the disconnection of said actuating means from said totalizer, a member for blocking said points, a one-way clutch for intermittently connecting said cam with said general operator, and a positive connection between said member and said general operator.

35. The combination with a totalizer, of actuating means for running up numbers on said totalizer, shifting means for determining the connection of said actuating means with said totalizer, a cam wheel having a series of cam teeth for manipulating said shifting means, each of said cam teeth comprising a camming portion and a resting portion, and a member acting to temporarily form a continuation of said resting portion to lengthen the duration of connection of said actuating means with said totalizer beyond the capacity of said cam.

36. The combination with a totalizer, of actuating means for running up numbers on said totalizer, shifting means for determining the connection of said actuating means with said totalizer, a cam wheel having a series of cam teeth for manipulating said shifting means, each of said cam teeth comprising a camming portion and a resting portion, a member acting to temporarily form a continuation of said resting portion to lengthen the duration of connection of said actuating means with said totalizer beyond the capacity of said cam, and means to afford a relative movement between said cam and said member so as to enable the disconnection of said actuating means from said totalizer.

37. In a computing machine, the combination with a totalizer, of actuating means therefor, said actuating means including a direct connection and an indirect connection to said totalizer, enabling addition and subtraction actions thereof, shifting means having alternatively actuable parts for determining whether one connection or the other shall be effective, and a cam member common to said alternatively actuable parts.

38. In a computing machine, the combination with a totalizer, of actuating means therefor, said actuating means including a direct connection and an indirect connection to said totalizer, enabling addition and subtraction actions thereof, shifting means having alternatively actuable parts for determining whether one connection or the other shall be effective, a cam member common to said alternatively actuable parts, and means for determining which of said parts said cam member shall actuate.

39. The combination with a totalizer, of actuating means for said totalizer, an adding arm for determining the connection of said actuating means to said totalizer for adding, a subtracting arm for determining the connection of said actuating means to said totalizer for subtracting, linkages connecting said arms to said actuating means, and means for alternatively actuating said arms.

40. The combination with a totalizer, of actuating means for said totalizer, an adding arm for determining the connection of said actuating means to said totalizer for adding, a subtracting arm for determining the connection of said actuating means to said totalizer for subtracting, linkages connecting said arms to said actuating means, a shaft for said arms, means for alternatively securing said arms to said shaft so as to rock therewith, an actuating arm secured to said shaft, and means for rocking said actuating arm to rock one of said first-mentioned arms.

41. The combination with a totalizer, of actuating means for said totalizer, an adding arm for determining the connection of said actuating means to said totalizer for adding, a subtracting arm for determining the connection of said actuating means to said totalizer for subtracting, linkages connecting said arms to said actuating means, a shaft for said arms, a key for locking either of said arms to said shaft, said key having an intermediate position independent of locking either of said arms to said shaft, and means for rocking said shaft.

42. The combination with a totalizer, of actuating means for said totalizer, said actuating means being arranged to drive said totalizer in one of two directions, a general operator for operating said actuating means, alternatively-effective connections for determining the character of drive of said totalizer by said actuating means, connections to said general operator enabling the completion to said totalizer of one of said alternatively-effective connections, and controlling means for determining which of said alternatively-effective connections shall be in action, said controlling means having an intermediate position corresponding to the ineffectiveness of both said alternatively-effective connections.

43. The combination with a totalizer, of actuating means for said totalizer, a general operator for operating said actuating means, a cam actuated by said general operator, a follower engaging said cam, an arm for said follower, a shaft secured to said arm, adding and subtracting arms loosely mounted on said shaft, a key for alternatively connecting said adding and subtracting arms to said shaft, a controlling lever for manipulating said key, and linkages connecting said arms to separate parts of said actuating means so as to govern the direction of drive of said totalizer by said actuating means.

44. The combination with a totalizer, of actuating means for said totalizer, a general operator for said actuating means, a cam wheel having several cam teeth, a one-way clutch for connecting said cam wheel to move with said general operator during one stroke thereof, an arm having a follower engaging said cam wheel so as to be actuated thereby, a shaft for said arm secured thereto so as to be rotated thereby, adding and subtracting arms loosely mounted on said shaft, a key secured to said shaft and movable to alternatively connect said adding and subtracting arms to said shaft, linkages connecting said adding and subtracting arms individually with said actuating means so as to enable the change in drive by said actuating means of said totalizer, a tens-carrying mechanism for said totalizer, means for reversing the drive of said tens-carrying mechanism, a control shaft, a lever for operating said control shaft, and connections from said control shaft to said tens-carrying means and said key to enable the concomitant change in the drive of said totalizer and drive of said tens-carrying means.

45. The combination with a plurality of totalizers arranged in parallel, each totalizer including a plurality of number-bearing computing wheels arranged to exhibit computations, of an actuating mechanism common to all of said totalizers, said actuating mechanism including a series of racks, one individual to each denominational order of said totalizers, each of said racks acting to simultaneously rotate a plurality of computing wheels in the same direction solely, one of which wheels is in any one totalizer whereby the same number is run into a plurality of totalizers at the same time, means for actuating said racks, one of said totalizers having a plurality of computing heads arranged in series, and means for bringing said heads individually into the sphere of action of said racks, so that the individual computing wheels thereof may be rotated by said racks.

46. The combination with a plurality of parallelly-arranged totalizers, of a series of racks common to all of said totalizers, each of said totalizers including a plurality of computing wheels with pinions individual to each wheel, a series of idle pinions individual to each of said totalizers, a carrier frame common to all of said series of idle pinions, and frame-shifting means operable to concurrently move all of the series of idle pinions along said racks to position to engage both the racks and the computing wheel pinions so as to effect a driving connection between said racks and all of said totalizers.

47. The combination with a totalizer having a series of computing wheels, of a series of racks for actuating said computing wheels, a series of pinions individual to each of said racks and the corresponding computing wheels for forming a driving connection between said racks and said computing wheels, and a yielding mounting individual to each of said pinions to enable said pinions to yield relative to their fellows.

48. The combination with a plurality of superposed totalizers each including a series of computing wheels, of a series of denominational members, each comprising an arcuate rack portion for simultaneously driving all of the computing wheels of the same denomination, and a rearwardly extending portion at one end of the rack having a series of pins settable thereon to determine the extent of oscillatory movement thereof, and a general operator having a bar swinging through the arc of a circle to engage the set pins on said denominational members to swing said denominational members through variable arcs of circles, so as to rotate said computing wheels amounts corresponding to the particular pins set on said denominational members.

49. The combination with a plurality of totalizers, each totalizer being arranged with its axis crossing the periphery of a circle having a given center, of a series of actuating members common to all of said totalizers and arranged to swing in the arcs of circles having centers coaxial with said given center, and a general operator swinging about a center coaxial with said given center, engaging said actuating members and positively moving them variable amounts to rotate the wheels of said totalizers variable amounts.

50. The combination with a plurality of totalizers, each including a series of computing wheels, said totalizers being out of end-for-end alinement with each other, of a series of racks for driving said totalizers, a plurality of sets of idle pinions floatingly mounted and shiftable to form an intermediate train between said racks and said totalizers, and a member common to all of said sets of pinions for shifting all of said sets concomitantly to bring them into use and to place them in disuse.

51. The combination with a plurality of totalizers out of end-for-end alinement with each other, each of said totalizers including a plurality of computing wheels, of a series of racks common to all of said totalizers, means for shifting all of said racks into direct drive with all of said totalizers, a plurality of series of idle pinions, one series for each totalizer, floatingly mounted so as to be movable from a position out of driving relation with said totalizers to a position forming intermediate trains between said racks and said totalizers, and a member common to all of said series of idle pinions for shifting the same concomitantly between positions of disuse to positions of use.

52. The combination with a plurality of computing wheels, of a carry-over mechanism for transferring complete rotations between adjacent computing wheels, vibrating driving means for said carry-over mechanism, and connections between said driving means and said carry-over mechanism effective to enable a drive of said carry-over mechanism by said vibrating driving means solely during an intermediate portion of one stroke of said vibrating driving means.

53. The combination with a totalizer having a series of computing wheels, of a series of arcuate racks for rotating said computing wheels, driving connections between said racks and said computing wheels, and means for swinging said racks in one path for addition and in another path for subtraction, said racks driving said computing wheels in both paths of their travel.

54. The combination with a series of computing wheels, of a series of arcuate racks for driving said computing wheels selectively in one direction or another, means for swinging said racks in two different paths at different distances from a center of rotation, and means for selectively determining in which of said paths said racks shall swing, said racks driving said wheels in whichever path they swing.

55. The combination with a plurality of computing heads, each including a series of computing wheels, of actuating mechanism having a plurality of actuating members corresponding to a series of successive denominations or orders and of a capacity equal to a computing head, means for enabling said computing heads to jump successively into coöperation with said actuating mechanism, said actuating mechanism being capable of driving said heads either forward or backward for addition or subtraction, controlling means for enabling the change in direction of drive so that any one of said computing heads may be alternatively caused to add or to subtract, and a separate computing head constantly remaining in coöperation with said actuating mechanism so as to accumulate the net result of the various additions and subtractions performed on the first-named heads.

56. The combination with a plurality of computing heads, each of which includes a plurality of computing wheels corresponding to certain denominations or orders, of actuating mechanism common to all of said computing heads and having a plurality of actuating members corresponding to denominations or orders and of a capacity equivalent to that of one of said computing heads, means for jumping said computing heads to bring said computing heads individually and successively into coöperative relation with respect to said actuating mechanism and with each computing wheel of a head in register with one of the order members of said actuating mechanism, means actuable to enable the drive of said computing heads by said actuating mechanism in one direction or the other for addition or subtraction, whereby any one of said computing heads may be alternatively caused to add or to subtract, a separate computing head constantly remaining in coöperative relation with respect to said actuating mechanism during the repeated movements of said computing heads, so as to accumulate the aggregate result of the additions and subtractions on said computing heads, tens-carrying mechanism common to all of the first-named computing heads, separate tens-carrying mechanism for the second-named computing head, driving mechanism common to all of said tens-carrying mechanisms, direction-of-drive controlling mechanism individual to each of said tens-carrying mechanisms, and a common shifting means for all of said direction-of-drive controlling mechanisms.

57. The combination with a plurality of totalizers located on the circumference of a circle having a definite center, of a plurality of tens-carrying mechanisms, one individual to each of said totalizers, said tens-carrying mechanisms being located on the arc of a circle having said definite center as a center, mechanism for actuating all of said totalizers simultaneously, said actuating mechanism being concentric with said definite center, means for driving all of said tens-carrying mechanisms simultaneously, said driving means being concentric with said definite center, and a general operator rotating about said center as a center for driving both said actuating mechanism and said tens-carrying mechanism driving means.

58. The combination with a totalizer, of a series of denominational members for driving said totalizer, said denominational members having pins settable thereon to determine the extent of movement thereof, setting mechanism for said pins, said denominational members being normally in a position corresponding to the positioning of said pins out of reach of said setting mechanism, means for shifting said denominational members individually to bring the pins thereon into the range of operation of said setting mechanism, and a general operator for advancing said denominational members amounts corresponding to the pins set thereon, said general operator having means to engage said denominational members to return the same toward their starting position, said denominational members moving by gravity at the end of the return movement of said general operator to clear said general operator so as to assume a position with the pins thereon out of range of said setting mechanism and yet capable of being adjusted into range of said setting mechanism.

59. The combination with a totalizer, of a series of denominational members for driving said totalizer, each of said denominational members having a series of pins settable thereon to determine the extent of movement thereof, setting mechanism for said pins, said denominational members and said pins normally occupying a position out of vertical alinement with said setting mechanism, denominational controlling mechanism for shifting said denominational members individually to bring the pins thereon into vertical alinement with said setting mechanism, and a general operator engaging the set pins on said denominational members to advance said denominational members amounts corresponding to the pins set, said general operator having means to engage said denominational members and return the same toward their initial positions, said denominational members swinging by gravity clear of said general operator at the end of the return stroke of said general operator, so as to bring the pins on said denominational members out of vertical alinement with said setting mechanism to admit of the individual re-adjustment of said denominational members by said denominational controlling means to bring the pins on individual denomination members into vertical alinement with said setting mechanism.

60. The combination with a plurality of vertically offset totalizers, of actuating means adjacent to said totalizers and including a plurality of order members individual to the different orders or denominations of said totalizers and extending substantially vertically alongside the same for movement endwise, controlling mechanism for determining the extent of movement of said actuating means, said controlling mechanism comprising a plurality of endwise movable individual denominational order members joined to the lower ends of the corresponding order members and extending substantially horizontally, and means for swinging the joined order members so as to transmit a simultaneous movement to all of said totalizers.

61. The combination with a totalizer including a plurality of computing wheels, of a plurality of order members, one individual to each of said computing wheels, said order members comprising driving means extending vertically alongside of said totalizer, and an extent-of-movement controlling means extending horizontally at a distance from said totalizer, said driving means and said extent-of-movement controlling means for each individual order member being united so as to move in unison, and a general operator for transferring movement to said order members so as to rotate said computing wheels.

62. The combination with a plurality of totalizers, of shifting means for determining the character of action of said totalizers, a cam repeatedly advancing to actuate said shifting means, and a rest advancing with said cam to aid in the action thereof, said rest deserting said cam and returning to its normal position leaving said cam in its advanced position.

63. The combination with a totalizer having a plurality of computing wheels, of a single set of arcuate racks for rotating said computing wheels either forwardly or backwardly, alternate driving connections between said racks and said computing wheels, and means for swinging said racks in two different paths of circles to rotate said computing wheels in opposite directions, said racks driving said computing wheels directly in one path of movement and indirectly in their other path of movement.

64. The combination, with a plurality of superposed totalizers, each including a series of number-bearing computing wheels; of a series of vertical racks for simultaneously driving the wheels of like denomination in all of said totalizers so as to run the same number into all of them at the same time, each of said racks having a substantially horizontal rearwardly-extending driving member connected to its lower end and provided with a plurality of devices settable thereon to determine the extent of movement of said members and their connected racks; and means located adjacent said driving members for setting said devices; a swinging general operator provided with a crossbar movable in a path parallel with and adjacent to that of said driving members, so as to directly engage the set devices, to swing said racks endwise to the extents so determined.

65. The combination, with a pair of totalizers, one of which comprises a series of separate computing heads arranged to travel relatively to the other totalizer to position a selected computing head for coöperation therewith; of mechanism for setting up or indexing all of the digits of a number prior to computation thereof; and transferring mechanism arranged to drive the second-named totalizer and the particular computing head so positioned, directly and simultaneously, so as to run the same indexed number into both at the same time, each totalizer having an individual driving connection with said transferring mechanism for that purpose.

66. The combination, with a pair of totalizers, one of which comprises a series of separate computing heads arranged to travel relatively to the other totalizer to position a selected computing head for coöperation therewith; of mechanism for setting up or indexing all of the digits of a number prior to computation thereof; transferring mechanism arranged to drive the second-named totalizer and the particular computing head so positioned, directly and simultaneously, so as to run the same indexed number into both at the same time, each totalizer having an individual driving connection with said transferring mechanism for that purpose; and means for controlling the direction of such drive and, hence, the character of computation carried on in said second-named totalizer and associated computing head.

67. The combination, with a pair of totalizers, one of which comprises a series of separate computing heads arranged to travel relatively to the other totalizer to position a selected computing head for coöperation therewith; of mechanism for setting up or indexing all of the digits of a number prior to computation thereof; and transferring mechanism arranged, during a single movement thereof in one direction, to directly and simultaneously drive the second-named totalizer and the particular computing head so positioned in the same direction, so as to run the same indexed number into both at the same time, each totalizer having an individual driving connection with said transferring mechanism for that purpose.

68. The combination, with a pair of totalizers, one of which comprises a series of separate computing heads arranged to travel relatively to the other totalizer to position a selected computing head for coöperation therewith; of mechanism for setting up or indexing all of the digits of a number prior to computation thereof; transferring mechanism arranged, during a single movement thereof in one direction, to directly and simultaneously drive the second-named totalizer and the particular computing head so positioned in the same direction, so as to run the same indexed number into both at the same time, each totalizer having an individual driving connection with said transferring mechanism for that purpose; and means for controlling the direction of such drive and, hence, the character of computation carried on in said second-named totalizer and associated computing head.

69. In a computing machine, the combination with a totalizer, of a series of pivotally-mounted segments for actuating said totalizer, one segment for each denomination, each segment having an arcuate portion bearing a series of indexing devices and a radial arm, means for setting the indexing devices to determine the amount of movement of said segments, a general operator, means controlled thereby for co-acting with the set indexing devices to move the segments in one direction to actuate the totalizer, and means controlled by said general operator for co-acting with said radial arm to return said segments toward normal positions.

70. In a computing machine, the combination with a totalizer having numeral wheels, of a series of rack-bars for driving said wheels and always effective in the same direction, said rack-bars being normally disconnected from driving relation with said wheels, a cam member, means controlled from said cam member for moving said rack-bars into engagement with said wheels for driving said wheels in one direction, a series of floating idle pinions constantly in mesh with said rack-bars, and means also controlled from said cam member for moving said floating pinions into mesh with said numeral wheels, to enable said rack-bars to drive said numeral wheels in the reverse direction.

71. In a computing machine, the combination with a totalizer having numeral wheels, of a series of rack-bars for driving said wheels and always effective in the same direction, said rack-bars being normally disconnected from driving relation with said wheels, a cam member, a lever shiftable thereby, connections from said lever to said rack-bars for shifting said rack-bars into engagement with said wheels for driving said wheels in one direction, a series of floating idle pinions constantly in mesh with said rack-bars, connections from said lever for moving said idle pinions into mesh with said numeral wheels for effecting driving relation between said rack-bars and said wheels in the reverse direction, and means for rendering one of said connections from said lever effective and rendering the other connection ineffective.

72. In a computing machine, the combination with a totalizer, of driving members therefor, said totalizer and said members being normally disengaged, a rotary cam having a series of cam portions, and means for effecting successive engagements and disengagements between said totalizer and said driving members during a single rotation of said cam.

73. In a computing machine, the combination with a totalizer, of driving members therefor, said totalizer and said members being normally disengaged, a rotary cam having a series of cam portions, a general operator, and means controlled by said general operator for rotating said cam to bring successive cam portions thereof to effective position, whereby on each movement of said general operator, said totalizer and driving members are brought into engagement by said cam.

BURNHAM C. STICKNEY.

Witnesses:
Titus H. Irons,
J. A. Brophy.

Copies of this patent may be obtained for five cents each, by addressing the "Commissioner of Patents, Washington, D. C."